US012111977B2

(12) United States Patent
Kim

(10) Patent No.: US 12,111,977 B2
(45) Date of Patent: Oct. 8, 2024

(54) DEVICE AND METHOD FOR INPUTTING CHARACTERS

(71) Applicant: Bonggeun Kim, Seoul (KR)

(72) Inventor: Bonggeun Kim, Seoul (KR)

( * ) Notice: Subject to any disclaimer, the term of this patent is extended or adjusted under 35 U.S.C. 154(b) by 48 days.

(21) Appl. No.: 18/307,807

(22) Filed: Apr. 27, 2023

(65) Prior Publication Data

US 2024/0077952 A1 Mar. 7, 2024

Related U.S. Application Data

(63) Continuation-in-part of application No. 17/868,791, filed on Jul. 20, 2022, now abandoned.

(30) Foreign Application Priority Data

Jul. 6, 2022 (KR) .......................... 10-2022-0083370

(51) Int. Cl.
*G06F 3/023* (2006.01)
*G06F 3/04817* (2022.01)
(Continued)

(52) U.S. Cl.
CPC .......... *G06F 3/0233* (2013.01); *G06F 3/0236* (2013.01); *G06F 3/04817* (2013.01); *G06F 3/04842* (2013.01); *G06F 3/04886* (2013.01)

(58) Field of Classification Search
None
See application file for complete search history.

(56) References Cited

U.S. PATENT DOCUMENTS 9,794,202 B1 10/2017 Pereira et al.
10,445,425 B2 * 10/2019 Jon ........................ G06F 40/274
(Continued)

FOREIGN PATENT DOCUMENTS

KR 10-2018-0125237 A 11/2018
KR 10-2020-0041750 A 4/2020
(Continued)

OTHER PUBLICATIONS

N/A (Google Translate contributors, Trans.). Google Translate. Retrieved Feb. 2, 2023, from https://translate.google.com/?sl=ko&tl=en&text=%EB%82%B4%EA%B0%80%20%EA%B0%80%EC%9E%A5%20%EC%A2%8B%EC%95%84%ED%95%98%EB%8A%94%20%EC%9D%80%EC%95% (Year: 2023).
(Continued)

*Primary Examiner* — Linda Huynh
(74) *Attorney, Agent, or Firm* — CANTOR COLBURN LLP

(57) ABSTRACT

A method includes displaying a first screen of a keyboard area having an upper pseudo-image part, a lower pseudo-image part, and multiple image-pixel keys, changing a Unicode character in one of the upper pseudo-image part and the lower pseudo-image part into a first non-blank Unicode character in the first screen in response to a first image-pixel key input, displaying a second screen of the keyboard area different from the first screen, providing the upper pseudo-image part in a text input area in response to a first image-part key input, providing a word in the text input area in response to at least one letter key input, and providing the lower pseudo-image part in the text input area in response to a second image-part key input.

20 Claims, 43 Drawing Sheets

(51) Int. Cl.
*G06F 3/04842* (2022.01)
*G06F 3/04886* (2022.01)

(56) References Cited

U.S. PATENT DOCUMENTS

| | | | |
|---|---|---|---|
| 11,531,406 B2* | 12/2022 | Bayer | G06F 40/53 |
| 2011/0055585 A1* | 3/2011 | Lee | H04L 9/3226 |
| | | | 713/183 |
| 2011/0317919 A1 | 12/2011 | Wong et al. | |
| 2014/0212007 A1* | 7/2014 | Oh | G06F 40/109 |
| | | | 382/119 |
| 2015/0222586 A1 | 8/2015 | Ebersman et al. | |
| 2016/0070441 A1 | 3/2016 | Paek et al. | |
| 2016/0291822 A1* | 10/2016 | Ahuja | H04L 51/52 |
| 2017/0083174 A1* | 3/2017 | Tobens, III | G06F 3/0485 |
| 2017/0300462 A1* | 10/2017 | Cudworth | G06F 40/274 |
| 2017/0308290 A1 | 10/2017 | Patel | |
| 2017/0308293 A1* | 10/2017 | Lee | G06F 3/04886 |
| 2018/0136837 A1 | 5/2018 | Curchod | |
| 2019/0204934 A1 | 7/2019 | Lee et al. | |
| 2020/0019307 A1 | 1/2020 | Sawa | |
| 2021/0096729 A1* | 4/2021 | Dalonzo | G06F 3/04845 |
| 2021/0103696 A1* | 4/2021 | Kim | G06F 3/04886 |
| 2021/0216203 A1* | 7/2021 | Wu | H04M 1/72436 |
| 2021/0397270 A1* | 12/2021 | Misra | G06F 3/0237 |
| 2023/0410394 A1* | 12/2023 | Wang | G06F 16/538 |

FOREIGN PATENT DOCUMENTS

| | | |
|---|---|---|
| KR | 10-2149099 B1 | 8/2020 |
| KR | 10-2021-0043669 A | 4/2021 |
| KR | 10-2022-0039661 A | 3/2022 |
| WO | 2020/080644 A1 | 4/2020 |

OTHER PUBLICATIONS

Korean Office Action for KR Application No. 10-2022-0083370 mailed on Sep. 19, 2022. In conformance with MPEP 609—Concise explanation of the relevance includes issue date of KR OA.

* cited by examiner 230a 230b 230c 230d 230a    230b 230a  230b

DEVICE AND METHOD FOR INPUTTING CHARACTERS

CROSS-REFERENCE TO RELATED APPLICATION

This application is a continuation-in-part application of U.S. Non-Provisional patent application Ser. No. 17/868,791, filed on Jul. 20, 2022, which claims the benefit of and priority to Korean Patent Application No. 10-2022-0083370, filed on Jul. 6, 2022, all of which are incorporated herein by reference in their entirety.

FIELD

The disclosure relates to technologies for inputting characters which causes a device to be used to facilitate inputting characters.

BACKGROUND

As mobile devices such as smartphones, tablet computers, etc. are widely used, the messages users communicate on social network services (SNS) are significantly increasing. Recently, a variety of user interface technologies on keyboards of mobile devices have been developed to facilitate inputting a user's message, for example, by altering the key arrangement of a keyboard, or by adding emoticons in the key arrangement of a keyboard. In addition, as the number of applications used in mobile devices increases, the types of SNS applications are also diversifying. In this regard, there are further needs on technologies to make a text representation more diverse.

SUMMARY

In an aspect, a method of inputting characters capable of being performed on a device is disclosed.

The device is configured to display a text input area that a text input position is located therein, and a keyboard area separate from the text input area. The text input area is configured so that characters are input in multiple text lines.

The method includes displaying a first screen of the keyboard area including an upper pseudo-image part, a lower pseudo-image part, and a plurality of image-pixel keys. Each of the image-pixel keys is a key associated with one or more non-blank Unicode characters to be included in a pseudo-image. The pseudo-image is a sequence of Unicode characters that, when provided in the text input area, represents a graphical concept having a single visual context not by an interpretation of literal meaning of the sequence of Unicode characters but by a combination of visual marks of the sequence of Unicode characters arranged across a plurality of text lines in the text input area. The pseudo-image includes the upper pseudo-image part and the lower pseudo-image part. The upper pseudo-image part is a first sequence of Unicode characters whose visual marks represent, when provided in the text input area, one or more upper graphical objects of the graphical concept. The lower pseudo-image part is a second sequence of Unicode characters whose visual marks represent, when provided in the text input area, one or more lower graphical objects of the graphical concept which are below the one or more upper graphical objects in the text input area. The upper pseudo-image part is disposed above the lower pseudo-image part in a vertical direction in the first screen.

The method further includes changing a Unicode character in one of the upper pseudo-image part and the lower pseudo-image part in the first screen into a first non-blank Unicode character in response to a first image-pixel key input corresponding to a first image-pixel key among the plurality of image-pixel keys. The first image-pixel key is a key associated with the first non-blank Unicode character.

The method further includes displaying a second screen of the keyboard area different from the first screen of the keyboard area. The second screen of the keyboard area has a first image-part key associated with the upper pseudo-image part, a second image-part key associated with the lower pseudo-image part, and a plurality of English letter keys.

The method further includes providing the upper pseudo-image part in the text input area in response to a first image-part key input corresponding to the first image-part key. The one or more upper graphical objects are represented by the upper pseudo-image part in the text input area.

The method further includes providing a plurality of Unicode characters that includes an English word in the text input area in response to at least one letter key input corresponding to at least one letter key among the plurality of English letter keys.

The method further includes providing the lower pseudo-image part in the text input area in response to a second image-part key input corresponding to the second image-part key. The one or more lower graphical objects are represented by the lower pseudo-image part in the text input area.

One of the upper pseudo-image part and the lower pseudo-image part provided in the text input area includes the first non-blank Unicode character.

The English word is located between the upper pseudo-image part and the lower pseudo-image part in the text input area with respect to a writing direction of English.

In some embodiments, the graphical concept may be represented after both the upper pseudo-image part and the lower pseudo-image part are provided in the text input area.

In some embodiments, the plurality of image-pixel keys may further include a second image-pixel key that is associated with a second non-blank Unicode character different from the first non-blank Unicode character. After the changing the Unicode character in the one of the upper pseudo-image part and the lower pseudo-image part in the first screen into the first non-blank Unicode character, and before the displaying the second screen of the keyboard area, the method may further include changing the first non-blank Unicode character in the one of the upper pseudo-image part and the lower pseudo-image part in the first screen into the second non-blank Unicode character in response to a second image-pixel key input corresponding to the second image-pixel key. The one of the upper pseudo-image part and the lower pseudo-image part provided in the text input area may include the second non-blank Unicode character instead of the first non-blank Unicode character.

In some embodiments, the graphical concept may be a human face. The one or more upper graphical objects may include one of an eyebrow and an eye, and the one or more lower graphical objects may include a mouth.

In some embodiments, the upper pseudo-image part and the lower pseudo-image part displayed in the first screen may represent a first facial expression of the human face before the changing the Unicode character in the one of the upper pseudo-image part and the lower pseudo-image part in the first screen into the first non-blank Unicode character. The upper pseudo-image part and the lower pseudo-image part displayed in the first screen may represent a second facial expression of the human face different from the first facial expression after the changing the Unicode character in the one of the upper pseudo-image part and the lower pseudo-image part in the first screen into the first non-blank Unicode character.

In some embodiments, the one or more upper graphical objects may further include an upper part of a speech bubble, and the one or more lower graphical objects may further include a lower part of a speech bubble.

In some embodiments, the English word may be located within a width of one of the upper part of the speech bubble and the lower part of the speech bubble in a horizontal direction of the text input area.

In some embodiments, the graphical concept may be an animal. The one or more upper graphical objects may include an eye, and the one or more lower graphical objects may include a body outline.

In some embodiments, the graphical concept may be an animal. The one or more upper graphical objects may include a head of the animal. The one or more lower graphical objects may include one of a foot and a tail of the animal.

In some embodiments, the graphical concept may be a natural scene. The one or more upper graphical objects may include one of a star, a sun, a moon, a cloud, a wave, and a water bubble. The one or more lower graphical objects may include one of a cloud, an animal, a plant, a building, a vehicle, a star, a wind, a rain, a snow, and a water bubble.

In some embodiments, one of the upper pseudo-image part and the lower pseudo-image part may include a blank Unicode character.

In some embodiments, one of the upper pseudo-image part and the lower pseudo-image part may include a new-line Unicode character.

In some embodiments, one of the upper pseudo-image part and the lower pseudo-image part may include an emoji Unicode character.

In some embodiments, in the second screen of the keyboard area, a first identification label of the first image-part key may include at least one Unicode character of the upper pseudo-image part, and a second identification label of the second image-part key may include at least one Unicode character of the lower pseudo-image part.

In some embodiments, the second screen of the keyboard area may include a main keyboard area and a supplementary keyboard area separate from the main keyboard area. The plurality of English letter keys may be displayed in the main keyboard area, and the plurality of image-part keys may be displayed in the supplementary keyboard area.

In some embodiments, the English word may be located in the same text line as a lowermost text line that the upper pseudo-image part is located in the text input area.

In some embodiments, the English word may be located in a text line above the lower pseudo-image part in the text input area.

In some embodiments, a count of text lines that the upper pseudo-image part is provided in the text input area may be different from a count of text lines that the lower pseudo-image part is provided.

In some embodiments, the lower pseudo-image part may be in a text line right below the upper pseudo-image part in the text input area.

In some embodiments, in the first screen of the keyboard area, the plurality of image-pixel keys may be disposed below the upper pseudo-image part and the lower pseudo-image part.

In some embodiments, the first screen of the keyboard area may further include a screen change key distinct from the plurality of image-pixel keys. The displaying the second screen of the keyboard area may include displaying the second screen of the keyboard area in response to a key input corresponding to the screen change key.

In some embodiments, the first screen of the keyboard area may further include a selection key on a first graphical object in the one or more upper graphical objects or in the one or more lower graphical objects. The changing the Unicode character in one of the upper pseudo-image part and the lower pseudo-image part in the first screen into the first non-blank Unicode character may include changing a Unicode character that corresponds to the first graphical object in one of the upper pseudo-image part and the lower pseudo-image part in the first screen into the first non-blank Unicode character.

In some embodiments, the second screen of the keyboard area may further include a third image-part key among the plurality of image-part keys. The English word may be a first English word, the plurality of Unicode characters including the first English word may be a first plurality of Unicode characters, the lower pseudo-image part may be a first lower pseudo-image part, and the one or more lower graphical objects may be one or more first lower graphical objects. After the providing the first lower pseudo-image part in the text input area in response to the second image-part key input corresponding to the second image-part key, the method may further include providing a second plurality of Unicode characters that includes a second English word in the text input area in response to at least one letter key input corresponding to at least one letter key among the plurality of English letter keys. The method may further include providing a second lower pseudo-image part in the text input area in response to a third image-part key input corresponding to the third image-part key. The second lower pseudo-image part may be a third sequence of Unicode characters whose visual marks represent one or more second lower graphical objects of the graphical concept below the one or more first lower graphical objects of the graphical concept in the text input area. The second English word may be between the one or more first lower graphical objects of the graphical concept and the one or more second lower graphical objects of the graphical concept in the text input area with respect to the writing direction of English.

In another aspect, a method of inputting characters capable of being performed on a device is disclosed.

The device is configured to display a text input area that a text input position is located therein, and a keyboard area separate from the text input area. The text input area is configured so that characters are input in multiple text lines.

The method includes displaying multiple keys in the keyboard area. The multiple keys include a plurality of letter keys associated with a locale language and a plurality of image-part keys associated with different parts of a pseudo-image. The plurality of image-part keys includes a first image-part key associated with an upper pseudo-image part of the pseudo-image and a second image-part key associated with a first lower pseudo-image part of the pseudo-image. The pseudo-image is a sequence of Unicode characters that, when provided in the text input area, represents a graphical concept having a single visual context not by an interpretation of literal meaning of the sequence of Unicode characters but by a combination of visual marks of the sequence of Unicode characters arranged across a plurality of text lines in the text input area.

The method further includes receiving a first image-part key input corresponding to the first image-part key.

The method further includes, in response to the first image-part key input, providing the upper pseudo-image part in the text input area. The upper pseudo-image part is a first sequence of Unicode characters whose visual marks represent one or more upper graphical objects of the graphical concept in the text input area.

The method further includes receiving at least one letter key input corresponding to at least one letter key among the plurality of letter keys.

The method further includes, in response to the at least one letter key input, providing a plurality of Unicode characters associated with the locale language in the text input area. The plurality of Unicode characters associated with the locale language includes a word in the locale language.

The method further includes receiving a second image-part key input corresponding to the second image-part key.

The method further includes, in response to the second image-part key input, providing the first lower pseudo-image part in the text input area. The first lower pseudo-image part is a second sequence of Unicode characters whose visual marks represent one or more first lower graphical objects of the graphical concept in the text input area. The one or more first lower graphical objects of the graphical concept is below the one or more upper graphical objects of the graphical concept in the plurality of text lines.

The word is located between the one or more upper graphical objects of the graphical concept and the one or more first lower graphical objects of the graphical concept in the text input area with respect to a writing direction of the locale language.

In some embodiments, the graphical concept may be one of a human face, an animal, and a natural scene. The one or more upper graphical objects may include one of an eyebrow and an eye in the human face if the graphical concept is the human face. The one or more upper graphical objects may include an eye of the animal if the graphical concept is the animal. The one or more upper graphical objects may include one of a star, a sun, a moon, and a cloud if the graphical concept is the natural scene. The one or more upper graphical objects may include one of a wave and a water bubble if the graphical concept is the natural scene. The one or more first lower graphical objects may include a mouth in the human face if the graphical concept is the human face. The one or more first lower graphical objects may include one of a foot, a body outline, and a tail of the animal if the graphical concept is the animal. The one or more first lower graphical objects may include one of a vehicle, a flower, a wind, a rain, and a snow if the graphical concept is the natural scene. The one or more first lower graphical objects may include one of a water bubble and a fish if the graphical concept is the natural scene.

In some embodiments, the plurality of image-part keys may include a third image-part key associated with a second lower pseudo-image part of the pseudo-image. After the providing the first lower pseudo-image part in the text input area, the method may further include receiving a third image-part key input corresponding to the third image-part key, and in response to the third image-part key input, providing the second lower pseudo-image part in the text input area. The second lower pseudo-image part may be a third sequence of Unicode characters whose visual marks represent one or more second lower graphical objects of the graphical concept below the one or more first lower graphical objects in the text input area.

In some embodiments, the graphical concept may be a human face. The one or more upper graphical objects may include one of a hair and a fashion item put on the human face. The one or more first lower graphical objects may include one of an eyebrow and an eye. The one or more second lower graphical objects may include a mouth.

In an aspect, a device for inputting characters according to an embodiment of the disclosure is disclosed. The device includes a key input unit, a display unit, and a controller. The controller is configured to execute computer-readable instructions. The instructions, when executed by the controller, are configured to cause the controller to display a text input area and a keyboard area different from the text input area on the display unit. A text input position is located in the text input area. The key input unit includes the keyboard area. The text input area is configured so that characters are input in a plurality of text lines.

The instructions, when executed by the controller, are configured to cause the controller to display multiple keys in the keyboard area. The multiple keys include a plurality of letter keys associated with a locale language and a plurality of image-part keys associated with different parts of a pseudo-image. The plurality of image-part keys includes a first image-part key associated with an upper pseudo-image part of the pseudo-image and a second image-part key associated with a lower pseudo-image part of the pseudo-image. The pseudo-image is a sequence of Unicode characters that, when provided in the text input area, represents a graphical concept having a single visual context not by an interpretation of literal meaning of the Unicode characters but by a combination of visual marks of the Unicode characters arranged across a plurality of text lines in the text input area.

The instructions, when executed by the controller, are further configured to receive a first image-part key input corresponding to the first image-part key.

The instructions, when executed by the controller, are further configured to provide the upper pseudo-image part in the text input area in response to the first image-part key input. The upper pseudo-image part is a first sequence of Unicode characters whose visual marks represent one or more upper graphical objects of the graphical concept in the text input area.

The instructions, when executed by the controller, are further configured to receive at least one letter key input corresponding to at least one letter key among the plurality of letter keys.

The instructions, when executed by the controller, are further configured to, in response to the at least one letter key input, provide a plurality of Unicode characters associated with the locale language in the text input area. The plurality of Unicode characters associated with the locale language includes a word in the locale language.

The instructions, when executed by the controller, are further configured to receive a second image-part key input corresponding to the second image-part key.

The instructions, when executed by the controller, are further configured to provide the lower pseudo-image part in the text input area in response to the second image-part key input. The lower pseudo-image part is a second sequence of Unicode characters whose visual marks represent one or more first lower graphical objects of the graphical concept in the text input area. The one or more first lower graphical objects of the graphical concept is below the one or more upper graphical objects of the graphical concept in the plurality of text lines.

The word is between the one or more upper graphical objects of the graphical concept and the one or more first lower graphical objects of the graphical concept in the text input area with respect to a writing direction of the locale language.

According to devices and methods for inputting characters as described herein, a device may be used to facilitate inputting characters in various representation.

BRIEF DESCRIPTION OF THE DRAWINGS

Like reference numbers and designations in the various drawings indicate like elements.

DETAILED DESCRIPTION

Embodiments of the disclosure are described in detail below with reference to the accompanying drawings.

Terms used throughout this specification may have meanings in nuances suggested or implied in the context beyond explicitly stated meanings.

Terms such as "in an embodiment", "in an exemplary embodiment", "in some embodiments", or the like used in the disclosure may not necessarily refer to the same embodiment, while terms such as "in another embodiment", "in another exemplary embodiment", "in other embodiments", or the like may refer to a different embodiment or may not necessarily refer to a different embodiment.

Terms such as "and", "or", and "and/or" used in the disclosure may include various meanings which may at least partially depend on the context in which they are used.

Terms such as "first", "second", "third", or the like used in the disclosure may refer to various elements regardless of their order and/or importance, and they do not limit those elements. For example, a first element and a second element may refer to different elements regardless of their order and/or importance. For example, without departing from the scope described in the disclosure, a first element may be referred to a second element, and similarly, a second element may be referred to a first element.

In addition, terms such as "at least one", and "one or more" used in the disclosure may be used, at least in part, depending on the context, to describe any feature, structure or property having a single element, or to describe features, structures or combination thereof having a plurality of elements.

In the disclosure, the word "comprising", "including", "having", or the like does not exclude other elements or steps, and the indefinite article "a" or "an" does not exclude a plurality.

Furthermore, terms such as "based on", "in response to" and "responsive to" are not intended to describe an exclusive set of elements, but they are intended to, at least partially, allow the existence of additional elements which are not explicitly described, depending on the context.

Unless stated otherwise, all the technical and scientific terms used in the specification have the same meanings as those generally understood by one skilled in the art.

Figure 1:
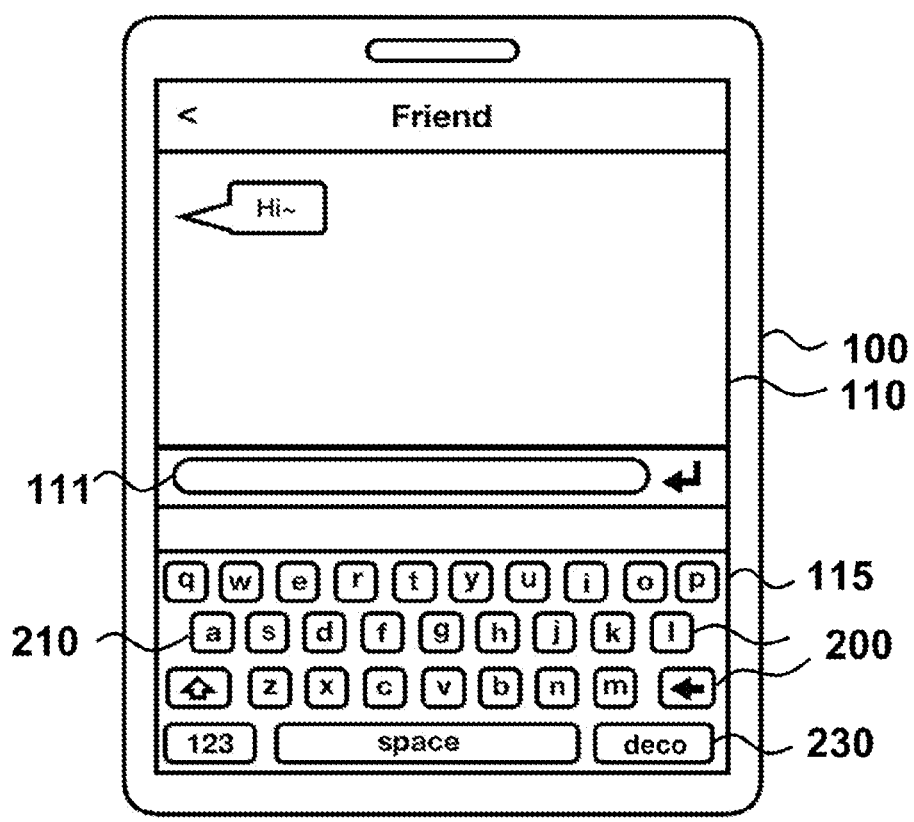
FIGS. 1-3 are exemplary drawings respectively illustrating a device according to embodiments of the disclosure.
Figure 2:
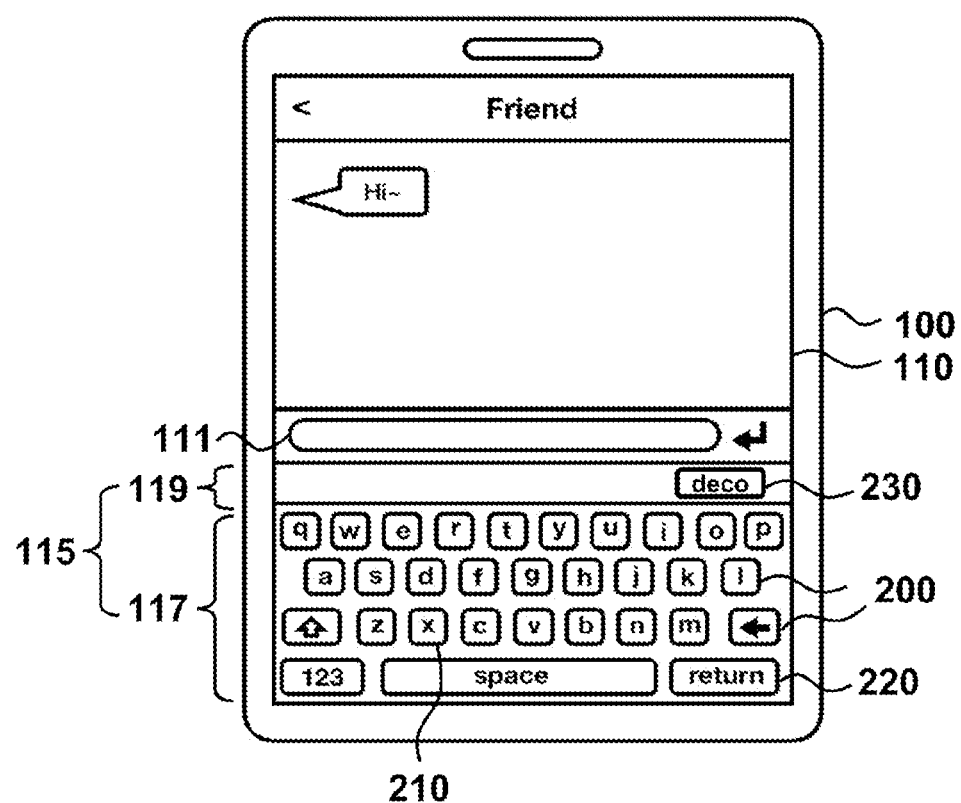
Figure 3:
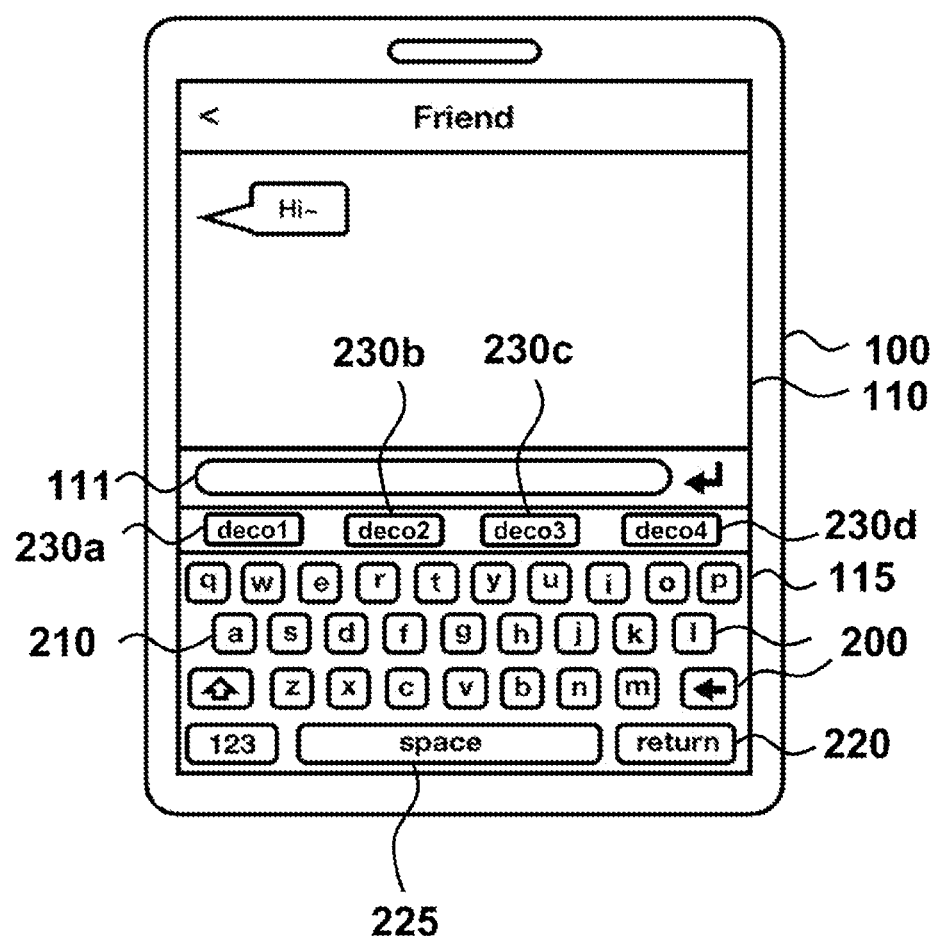

FIGS. 1-3 are exemplary drawings respectively illustrating a device according to embodiments of the disclosure.

Referring to FIGS. 1-3, a device 100 may include a key input unit, a controller (not shown), and a display unit 110. If the device 100 includes a touchscreen, the key input unit may be implemented as a keyboard area 115 displayed on the display unit 110.

The key input unit is a unit on which a key input for characters is provided from a user. The key input from a user may include inputs by physical and direct contact(s) on the key input unit. Additionally, or alternatively, the key input from a user may include indirect inputs by which the key input is provided using separate intermediate devices/modules, or wired and/or wireless connections including optical media, electrical media, electronic media, or a combination thereof, so that indirect inputs have substantially the same effect as the physical input on the key input unit.

The controller may be configured to provide a result value (e.g., one or more Unicode characters) based on a key input, to an interface object in which the result value is to be input (e.g., a text input area 111 displayed on a screen, as discussed below).

Although the device 100 is illustrated as a mobile device in FIGS. 1-3, the device is not limited thereto. The device 100 may be any electronic device configured to receive a key input from a user, and to allow an interface object of the device to render Unicode characters of predetermined code points based on the key input.

For example, the device 100 may be a computing device that includes a processor (not shown), a memory (not shown) that computer-executable (and/or computer-readable) instructions are stored thereon, and a physical or virtual keyboard. The processor and the memory may be configured to operate as the controller of the device 100. In some embodiments, the computing device may include, but not limited to, electronic devices such as personal computers, smartphones, tablet computers, or laptop computers.

The key input unit of the device 100 may be implemented including various types of optical elements, electrical elements, electronic elements, or combinations thereof. For example, if the device 100 includes a touchscreen as illustrated in FIGS. 1-3, a part of the touchscreen may be configured to operate as the key input unit. In this case, a key input from a user may be provided via keys 200 in a keyboard area 115 displayed on the touchscreen.

The device 100 may be configured to display a text input area 111 and the keyboard area 115. The device 100 may be configured to provide, in the text input area 111, a result value (e.g., one or more Unicode characters) based on one or more key inputs.

For example, if the device 100 is a mobile device that includes a touchscreen as shown in FIGS. 1-3, the device 100 may be configured to provide a result value (e.g., one or more Unicode characters) in the text input area 111 via the controller (not shown) in response to one or more key inputs from the key input unit (i.e., keyboard area 115).

Referring to FIGS. 1-3, the display unit 110 of the device 100 may be configured to display a screen (also referred to a "view"). A plurality of interface objects, such as text, images, and graphical objects, etc. may be displayed on the screen. For example, in some embodiments, the interface objects may include a graphical user interface (GUI) object, a command line interface (CLI) object, and so on. The interface objects may include the text input area 111 in which text may be input.

For example, the text input area 111 may be a message input window in a message application. For example, the text input area 111 may be a message input window in an SNS application. However, the text input area 111 is not limited thereto. The text input area 111 may be any interface object allowing some text, which is input from the key input unit, to be displayed (e.g., rendered) on the screen of the device 100.

In the text input area 111, a plurality of letters (e.g., linguistic Unicode characters) may be provided (e.g., input, displayed, and/or rendered). For example, alphabet, Hangul, etc. may be provided in the text input area 111. However, letters are not limited thereto that may be provided in the text input area 111. For example, letters in several languages, such as Hiragana, Katakana, etc. may be provided in the text input area 111. In some embodiments, letters in two or more languages may be provided in the text input area 111. In some embodiments, nonlinguistic Unicode characters may also be provided in the text input area 111.

Unicode is an industry standard code system introduced to consistently represent all the characters in the world. Unicode characters include a variety of non-letter characters, such as numbers, phonetic symbols, symbols, emojis (also referred to emoticons), and so on, as well as letters.

Generally, when a text processing is performed on a computing system, Unicode serves to provide a unique code point, i.e., a code value, for each character. In this case, Unicode determines as to which code point is to be represented as a character while a visual rendering (in certain sizes, fonts, styles, etc.) of the character may typically be determined by a text renderer, an operating system, and/or an application (a web browser, a document editing program, a text processing module, a messenger application, an SNS application, etc.).

For example, a Unicode character of code point U+0041 represents a Basic Latin alphabet capital letter 'A' (hereinafter, 'U+' followed by a number indicates a hexadecimal representation of code point in Unicode). In this case, it may be determined by an application (and/or a module) that the Unicode character is text-processed (i.e., inputted, edited, etc.) in which size, in which font, and in what color the capital letter 'A' would be represented.

Currently, Unicode defines code points ranging from U+0000 to U+10FFFF. Unicode defines a code space that consists of code points. The code space has a total of 17 code planes from $0_{hex}$ to $10_{hex}$ corresponding to the number of digits at the 4-th or higher order in hexadecimal representation of code points. For example, code points in a range from U+0000 to U+FFFF belong to the Basic Multilingual Plane (BMP) which is the first plane (i.e., plane zero). Code points in the BMP include the most used, most modern letters.

The code plane that configures the code space of Unicode may be subdivided by code blocks. A code block is defined by a group of consecutive code points in a code plane. Some code blocks may be entitled, but some code blocks may not yet be entitled. For example, code points in a range from U+0000 to U+007F may be grouped into the Basic Latin block. For example, code points in a range from U+25A0 to U+25FF may be grouped into the block of Geometric Shapes. In the disclosure, Unicode characters belonging to several code blocks may be provided in the text input area 111.

In the text input area 111, Unicode characters may be provided in two or more text lines. For example, if a new-line Unicode character (e.g., a text line delimiter, such as a carriage return, a line feed, etc. such as U+000A) is provided in the text input area 111, text may be represented across different text lines. If text is displayed across different text lines, a character before the new-line character may be represented in a different text line from a character after the new-line character. Additionally, text may be represented across different text lines if the total number of characters provided in the text input area 111 exceeds the number of characters which may be represented within a horizontal (or a transverse) width of the text input area 111.

Referring to FIGS. 1-3, the device 100 is configured to display a keyboard area 115 different (e.g., separate) from the text input area 111 on the screen. A plurality of keys 200 may be displayed in the keyboard area 115. The plurality of keys 200 may include a plurality of letter keys 210 corresponding to letters in a locale language. Each of the plurality of letter keys 210 may be associated with a Unicode character in the locale language.

In the computer software fields, the term "locale" refers to a set of parameters that defines a language, a region, and any variant to be displayed in user interface views. One skilled in the art would recognize that a "locale language" is a language that a user of a device wants to see in user interface views of the device. For example, if a user of a device sets his/her locale region to the United States of America, then a locale language of the device may be English.

In the disclosure, the term a "writing direction of a language" refers to a direction in which text is provided (e.g., written, printed, displayed, and/or rendered) in the text input area 111. For example, in LTR (left-to-right) direction, which is the most common writing direction used in languages such as English and many others, text is written, printed, displayed, and/or rendered horizontally from left to right, and a next text line (and/or a new line) is written, printed, displayed, and/or rendered below a previous text line.

Figure 4:
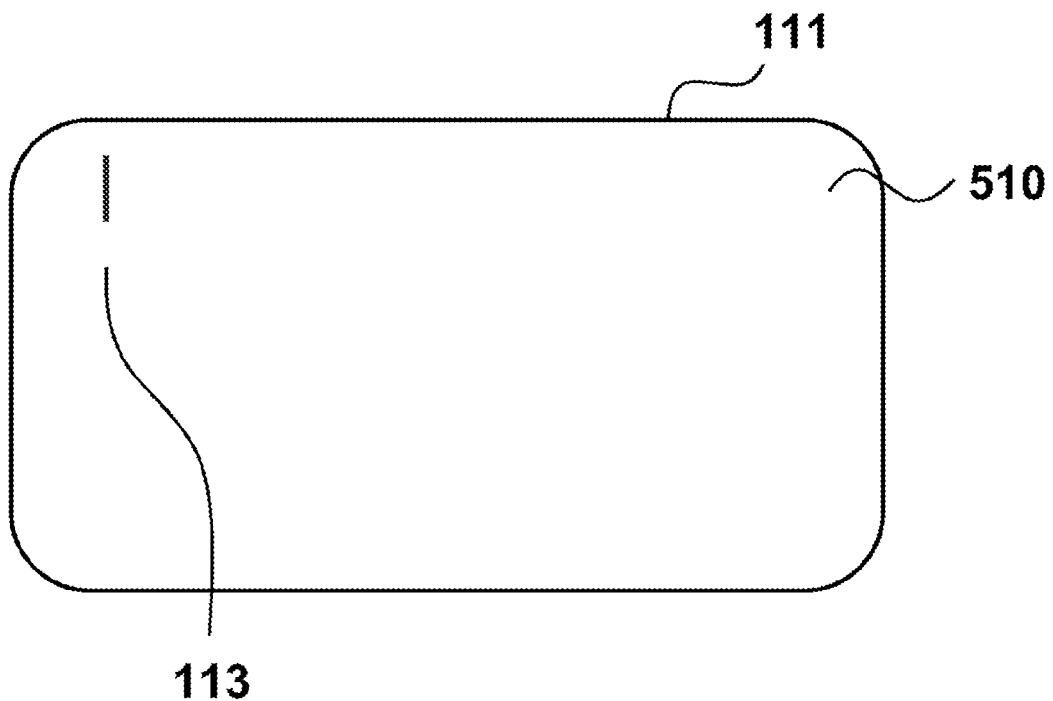
FIGS. 4-5 are exemplary drawings respectively illustrating a text input area of a device according to embodiments of the disclosure.
Figure 5:
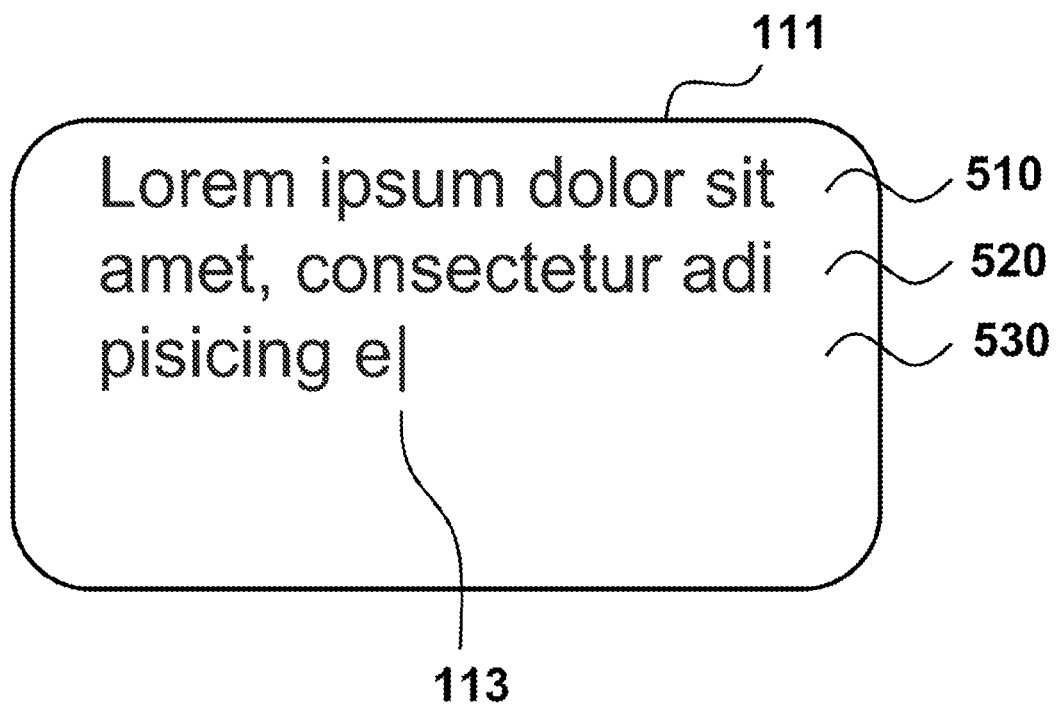

FIGS. 4-5 are exemplary drawings respectively illustrating a text input area of a device according to embodiments of the disclosure. Referring to FIGS. 4-5, a text input position 113 may be located in the text input area 111. For example, the text input position 113 may be indicated by a bar flickering at a predetermined time interval.

The device 100 may be configured to provide characters at the text input position 113 in text input area 111 in response to one or more key inputs, as described in detail below. The characters may be provided across multiple text lines, such as a first text line 510, a second text line 520, a third text line 530, and so on, in the text input area 111.

Referring to FIG. 5, if a locale language is English, a plurality of English Unicode characters may be provided in the text input area 111 in LTR direction. For example, a word "consectetur" in a second text line 520 may be provided between a word "amet" and a word "adi" in the text input area 111 in LTR direction. Also, in the disclosure, the word "consectetur" in the second text line 520 is referred to be located between a word "dolor" in a first text line 510 (or any other word in the first text line 510) and a word "pisicing" in a third text line 530 (or any other word in the third text line 530) in LTR direction. Therefore, the term "between" in the disclosure refers to a relative relationship of positions not only in a single text line but also in multiple text lines considering a writing direction of a locale language in the text input area 111. Although meaningless words are illustrated in FIG. 5, one skilled in the art would recognize that, in practice, any meaningful word will be provided in the text input area 111.

In the disclosure, the term a "Unicode character associated with a locale language" refers to a Unicode character that represents a grapheme in the locale language. A grapheme is the smallest unit of a writing system that conveys meaning. In the disclosure, a grapheme refers to an individual letter and/or symbol that represents a minimal writing unit in a language.

For example, if the locale language is English, a Unicode character associated with English may refer to a Unicode character that represents an English grapheme, e.g., such as a Unicode character corresponding to one of code points U+0041 to U+005A, or U+0061 to U+007A, which are alphabet letters belonging to the Basic Latin code block, or a Unicode character corresponding to one of code points U+1D400 to U+1D6A3, which are alphabet letters belonging to the Mathematical Alphanumeric Symbols code block.

Referring to FIGS. 1-3 again, for example, if the plurality of letter keys 210 are keys for inputting English letters, each of the English letter keys 210 may be associated with a Unicode character that is an English capital or lowercase letter belonging to the Basic Latin code block. However, the language is not limited thereto that letter keys 210 may be associated. For example, each of the letter keys 210 may be associated with Hangul letters, and so on.

The plurality of keys 200 may further include at least one image-part key 230 associated with a pseudo-image part. In the disclosure, an image-part key 230 is a key for inputting a pseudo-image part when a key input is provided, as described in detail below.

In the disclosure, the term a "pseudo-image" refers to a sequence of Unicode characters that represents a graphical concept having a single visual context, not by an interpretation of literal meaning of the sequence of Unicode characters, but by a combination of visual marks of the sequence of Unicode characters appropriately arranged (e.g., concatenated with or without a new-line Unicode character and/or a blank Unicode character) across multiple text lines in the text input area 111.

Herein, "visual marks of a Unicode character" refer to all the visual elements corresponding to the Unicode character when the Unicode character is displayed in the text input area 111. If a Unicode character in a given language code block is displayed in the text input area 111, visual marks of the Unicode character may refer to its glyph. A glyph is a graphical design or symbol that represents a character or characters in a writing system. It should be noted that a glyph may be displayed in diverse ways depending on a font or typeface being used while still conveying the same meaning.

If a Unicode character in a nonlinguistic code block is displayed in the text input area 111, visual marks of the Unicode character may refer to its specific shapes, colors, outlines (whether filled or not), contours, designs, and/or representation displayed in the text input area 111. If an emoji Unicode character (e.g., U+1F600, etc.) is displayed in the text input area 111, visual marks of the emoji Unicode character may refer to the entirety of individual visual elemental shapes, colors, outlines (whether filled or not), contours, design, and/or representation displayed in the text input area 111.

It should be noted that a pseudo-image discussed herein is not a single image in an image file format (e.g., SVG, JPEG, PNG, GIF, etc.) used in conventional computer technology applications. Also, it should be noted that a sequence of arbitrary Unicode characters does not necessarily represent a graphical concept having a single visual context in the text input area 111.

In the disclosure, the term a "graphical concept having a single visual context," or simply a "graphical concept" refers to a visually represented object or a combination of visually represented objects that has a single consistent visual context. For example, visually represented objects of a graphical concept may include a scene, a scene element, an animal, a person, a physical part of an animal, a physical part of a person, a face of an animal, a human face, a hair in a face, an eyebrow in a face, an eye in a face, a flush in a cheek, a nose in a face, a mouth in a face, a hand, a finger in a hand, a foot, a toe in a foot, an anthropomorphized animal, an anthropomorphized inanimate, and so on. For example, visually represented objects of a graphical concept may be one selected from above-listed objects or may include one or more combinations thereof. In some embodiments, one or more Unicode characters of given code points may correspond to one graphical object of the graphical concept. For example, a Unicode character of a given code point may correspond to one graphical object. Alternatively more than one Unicode characters of given code points may correspond to one graphical object.

As illustrated in FIG. 5, visual marks of a sequence of arbitrary Unicode characters (e.g., "Lorem ipsum dolor sit" in a first text line 510, "amet, consectetur adi" in a second text line 520, and "pisicing e" in a third text line 530) does not necessarily represent visually represented objects that has a single visual context. In contrast, visually represented objects that has a single visual context may be represented only when visual marks of a sequence of appropriately selected Unicode characters are appropriately arranged (e.g., concatenated) across multiple text lines in the text input area 111, as will be discussed below.

In the disclosure, the term a "pseudo-image part" refers to a component of a pseudo-image in the text input area 111. That is, a pseudo-image part is a sequence of Unicode characters whose visual marks represent a part of a graphical concept having one or more visually represented objects in the text input area 111. For example, if a pseudo-image represents a human face as a graphical concept, an upper pseudo-image part may include a sequence of Unicode characters whose visual marks represent hairs, a hat, a crown, and/or any fashion item put on a face of a person. For example, if a pseudo-image represents a human face as a graphical concept, a middle pseudo-image part may include a sequence of Unicode characters whose visual marks represent eyes, glasses, ears, cheeks, and/or a nose. For example, if a pseudo-image represents a human face as a graphical concept, a lower pseudo-image part may include a sequence of Unicode characters whose visual marks represent a mouth, chins, a beard, and/or a neck.

Herein, the terms "upper", "middle", "lower", "a first lower", "a second lower", etc. are relative terms regarding at which text line a pseudo-image part is positioned in a vertical (or a latitudinal) direction in the text input area 111. Herein, when at least one text line that a first pseudo-image part is located in the text input area 111 is upper than (and/or above) all the text lines that a second pseudo-image part is positioned in the text input area 111, then the first pseudo-image part is referred to be upper than (and/or above) the second pseudo-image part, and vice versa. For example, if a pseudo-image represents a human face as a graphical concept, a sequence of Unicode characters whose visual marks represent eyes may be lower than a sequence of Unicode characters whose visual marks represent hairs, while the sequence of Unicode characters whose visual marks represent eyes may be upper than a sequence of Unicode characters whose visual marks represent a mouth.

Figure 14:
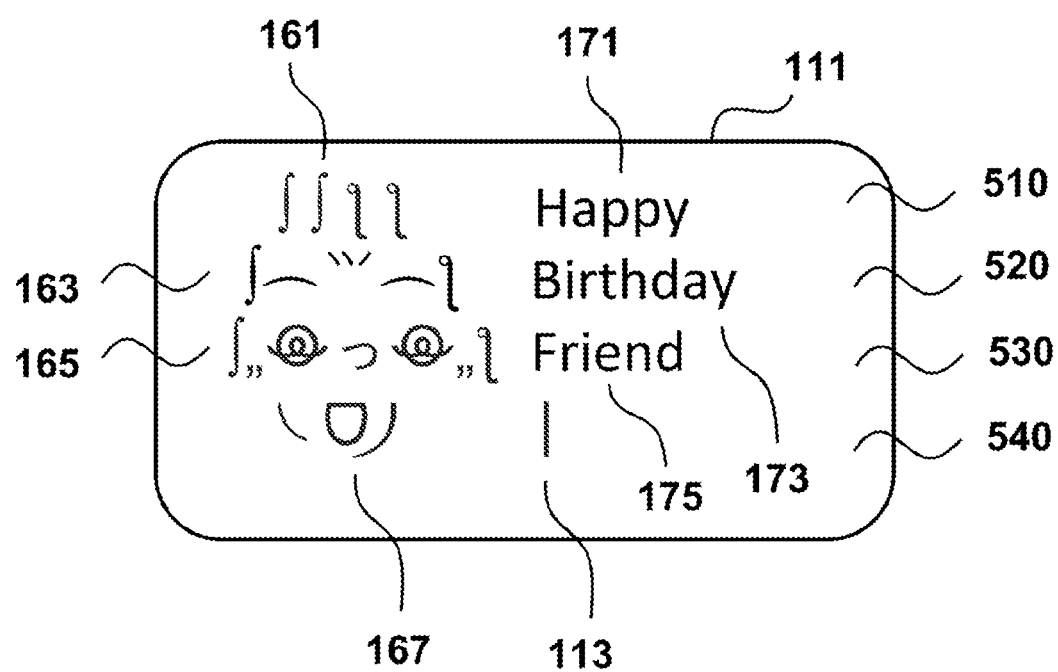
FIG. 14 is an exemplary drawing illustrating a text input area after step S27 further again according to an embodiment of the disclosure.

Although visual marks of a Unicode character may be displayed in a vectorized format or a rasterized format in the text input area 111, a pseudo-image is not limited by the format that a Unicode character is displayed in the text input area 111. In addition, although visual marks of a Unicode character may be displayed in slightly different sizes, slightly different colors, and/or slightly different shapes according to a text renderer, it should be noted that a component of a graphical concept that the Unicode character represents may not be altered in the text input area 111 regardless of the text renderer. For example, a Unicode character of code point U+222B whose Unicode Common Locale Data Repository (CLDR) short name (hereinafter, referred to "CLDR name") is "INTEGRAL" may be displayed in slightly different widths and/or heights according to an operating system and/or an application that renders the Unicode character. However, for example, if a graphical concept represented by a sequence of Unicode characters is a human face, then visual marks of a Unicode character of code point U+222B may represent "a hair" as illustrated in FIG. 14 although a width and/or a height of the "hair" may be slightly different in the text input area 111 according to an operating system.

Referring to FIGS. 1-3 again, one or more image-part keys 230, 230a-230d may be positioned in a variety of locations within the keyboard area 115. In some embodiments, an image-part key 230 may be placed at a position where a conventional control key (e.g., a shift key, a space key, a return key, etc.) is placed in a key arrangement in the keyboard area 115. For example, an image-part key 230 may be placed at a position where a conventional return key 220 is placed in a typical key arrangement in a virtual keyboard as illustrated in FIG. 1.

In some embodiments, the keyboard area 115 may include a main keyboard area 117 and a supplementary keyboard area 119 separate from the main keyboard area 117 as illustrated in FIG. 2. For example, a plurality of letter keys 210 may be displayed in the main keyboard area 117. For example, one or more image-part keys 230, 230a-230d may be displayed in the supplementary keyboard area 119 as illustrated in FIGS. 2-3. In this case, an image-part key 230, 230a-230d may not overlap the plurality of letter keys 210 in the keyboard area 115.

Although not illustrated in drawings, in some embodiments, an image-part key 230 may overlap a letter key in the keyboard area 115. In this case, the key input on the image-part key 230 may be processed by the device 100 as a key input substantially identical to the key input on the letter key. This may have an effect that a pseudo-image part and a Unicode character associated with a locale language are provided together in the text input area 111 in response to a single key input.

Referring to FIG. 3, in some embodiments, more than one image-part keys 230a-230d may be located in the keyboard area 115. In this case, each of the image-part keys 230a-230d may be associated with different pseudo-image parts of a pseudo-image. That is, each of the image-part keys 230a-230d may be keys for inputting a pseudo-image part when a key input is provided. For example, if a pseudo-image represents a human face as a graphical concept, a first image-part key 230a may be associated with Unicode characters whose visual marks represent hairs located above eyebrows. For example, a second image-part key 230b may be associated with Unicode characters whose visual marks represent eyebrows located above eyes. For example, a third image-part key 230c may be associated with Unicode characters whose visual marks represent eyes and/or a nose. For example, a fourth image-part key 230d may be associated with Unicode characters whose visual marks represent a mouth and/or chins.

Figure 6:
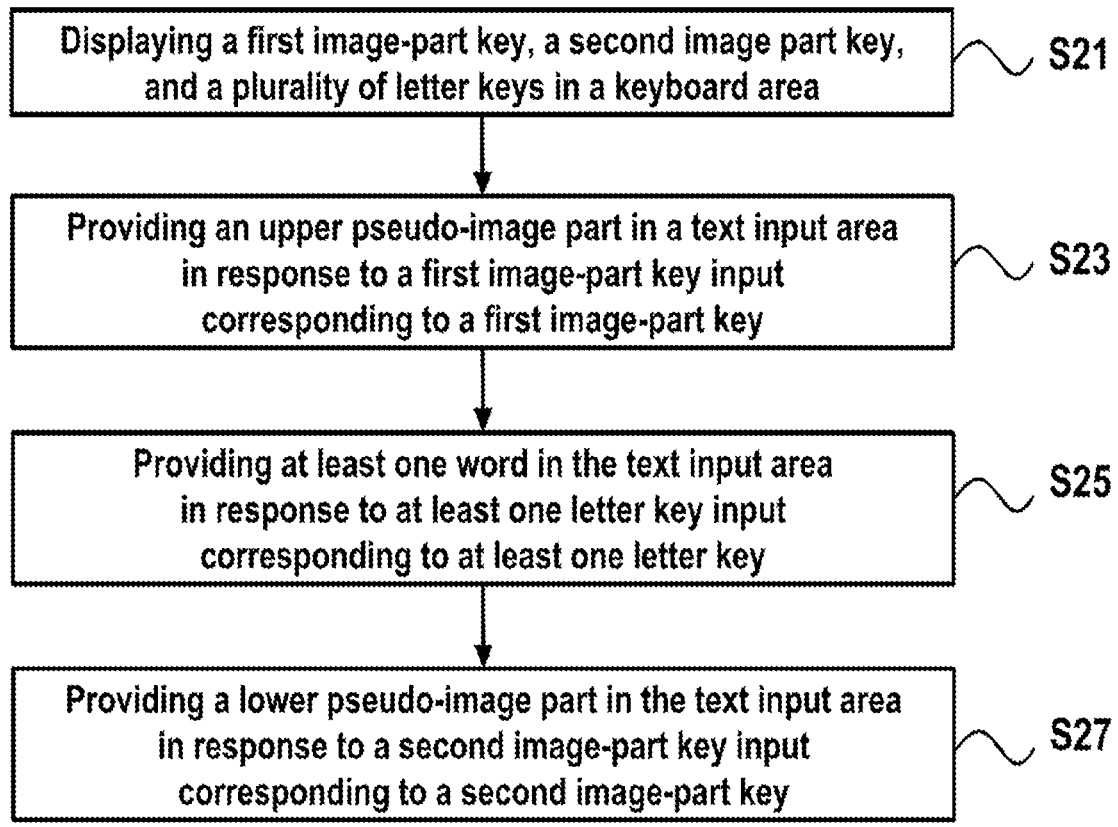
FIG. 6 is a flow chart illustrating a method for inputting characters according to an embodiment of the disclosure.

FIG. 6 is a flow chart illustrating a method for inputting characters according to an embodiment of the disclosure. The method includes a step S21 of displaying a first image-part key, a second image part key, and a plurality of letter keys in a keyboard area, a step S23 of providing an upper pseudo-image part in a text input area in response to a first image-part key input corresponding to a first image-part key, a step S25 of providing at least one word in the text input area in response to at least one letter key input corresponding to at least one letter key, and a step S27 of providing a lower pseudo-image part in the text input area in response to a second image-part key input corresponding to a second image-part key. Hereinafter, each step is discussed in detail assuming that a locale language is English.

In step S21, the device 100 may display multiple keys 200 in the keyboard area 115. For example, the device 100 may display a first screen of the keyboard area 115. In the first screen, multiple keys 200 may be displayed including a plurality of letter keys 210 and a plurality of image-part keys 230a-230d. The plurality of letter keys 210 are keys associated with a locale language. For example, if the locale language is English, each of the letter keys 210 may be associated with an English alphabet. The plurality of image-part keys 230a-230d are keys associated with different parts of a pseudo-image. For example, a first image-part key 230a may be associated with an upper pseudo-image part of the pseudo-image. For example, a second image-part key 230b may be associated with a middle pseudo-image part of the pseudo-image. For example, a third image-part key 230c may be associated with a lower pseudo-image part of the pseudo-image. Herein, it should be noted that the terms "upper", "middle", and "lower" are used to refer relative relationship of positions over multiple text lines in the text input area 111 as discussed above. Also, it should be noted again, that the pseudo-image is a sequence of Unicode characters that represents, when provided in the text input area 111, a graphical concept having a single visual context by their visual marks over multiple text lines.

In some embodiments, each of the image-part keys 230, 230a-230d may have its own identification label. For example, a first image-part key 230a may have a first identification label, and a second image-part key 230b may have a second identification label different from the first identification label. Referring to FIGS. 1-2, an image-part key 230 may have "deco" as its identification label. Referring to FIG. 3, a first image-part key 230a, a second image-part key 230b, a third image-part key 230c, and a fourth image-part key 230d may have "deco1", "deco2", "deco3", and "deco4" as their identification labels, respectively. In some embodiments, an identification label of an image-part key 230, 230a-230d may include one or more Unicode characters among its associated pseudo-image part as illustrated in FIG. 7.

Figure 7:
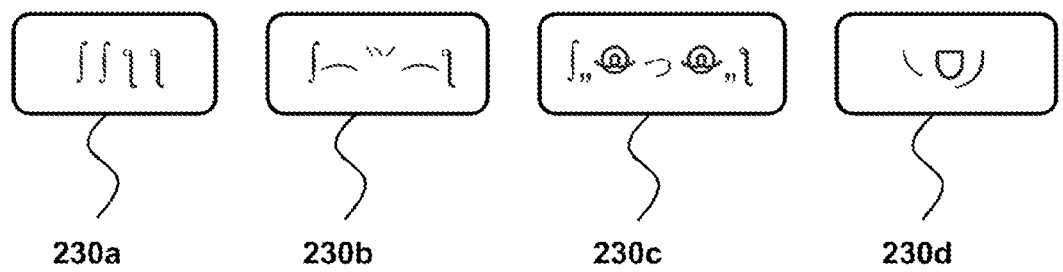
FIG. 7 is an exemplary drawing that multiple image-part keys have their own identification labels.

FIG. 7 is an exemplary drawing that multiple image-part keys have their own identification labels. Referring to FIG. 3 and FIG. 7, instead of "deco1", a first image-part key 230a may include, for example, two Unicode characters of code point U+222B (CLDR name: INTEGRAL), and two Unicode characters of code point U+01AA (CLDR name: LATIN LETTER REVERSED ESH LOOP) as its identification label. If a graphical concept represented by a pseudo-image is a human face, these Unicode characters with or without appropriate blanks (e.g., whitespaces) may represent "hairs" in the text input area 111 as discussed below.

Instead of "deco2", a second image-part key 230b may include, for example, a Unicode character of code point U+222B, a Unicode character of code point U+01AA, a Unicode character of code point U+2E8D (CLDR name: CJK RADICAL SMALL TWO), and two Unicode characters of code point U+2322 (CLDR name: FROWN) as its identification label. If a graphical concept represented by a pseudo-image is a human face, these Unicode characters (in an appropriate order) with or without appropriate blanks may represent "hairs, eyebrows, and a middle of eyebrows" in the text input area 111 as discussed below.

Instead of "deco3", a third image-part key 230c may include, for example, a Unicode character of code point U+222B, a Unicode character of code point U+01AA, two Unicode characters of code point U+201E (CLDR name: DOUBLE LOW-9 QUOTATION MARK), a Unicode character of code point U+3063 (CLDR name: HIRAGANA LETTER SMALL TU), and two Unicode characters of code point U+A598 (CLDR name: VAI SYLLABLE HUN) as its identification label. If a graphical concept represented by a pseudo-image is a human face, these Unicode characters (in an appropriate order) with or without appropriate blanks may represent "hairs, flushes in cheeks, and eyes" in the text input area 111 as discussed below.

Instead of "deco4", a fourth image-part key 230d may include, for example, a Unicode character of code point U+31CF (CLDR name: CJK STROKE N), a Unicode character of code point U+15DC (CLDR name: CANADIAN SYLLABICS CARRIER THU), a Unicode character of code point U+2D70 (CLDR name: TIFINAGH SEPARATOR MARK) as its identification label. If a graphical concept represented by a pseudo-image is a human face, these Unicode characters with or without appropriate blanks may represent "chins and a mouth" in the text input area 111 as discussed below.

By having one or more Unicode characters of its associated pseudo-image part as an identification label of an image-part key 230a-230d, a user of the device 100 may expect which Unicode characters would be provided in the text input area 111 when the image-part key is input. Although identification labels of image-part keys 230a-230d in FIG. 7 are illustrated for an example that a graphical concept is a human face, one skilled in the art would recognize that image-part keys 230a-230d will have different identification labels when a graphical concept represented by a pseudo-image is different from a human face.

In step S23, an upper pseudo-image part may be provided in the text input area 111 in response to a first image-part key input corresponding to a first image-part key. For example, a first image-part key may be the first image-part key 230a in FIG. 7. However, in some cases, a first image-part key may be any one of the image-part keys 230a-230c associated with a pseudo-image part whose visual marks represent, for example, a part of a face upper than a "mouth" part of the face, when provided in the text input area 111. In any cases, the device 100 may provide an upper pseudo-image part in the text input area 111 in response to the first image-part key input as illustrated in FIG. 8.

Figure 8:
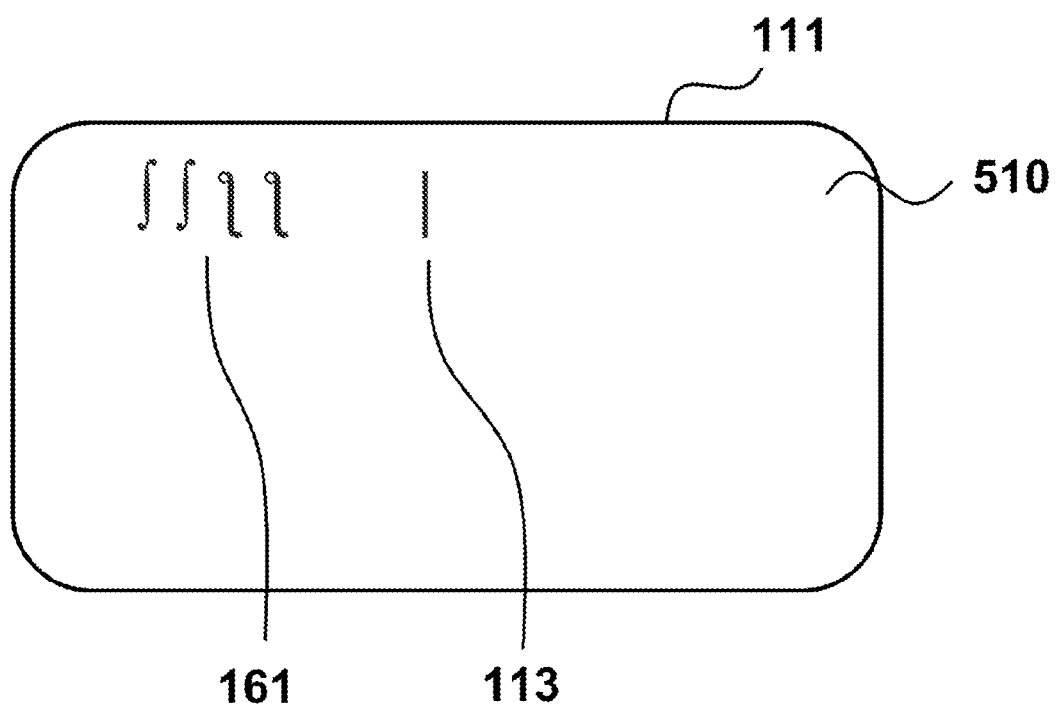
FIG. 8 is an exemplary drawing illustrating a text input area after step S23 according to an embodiment of the disclosure.

FIG. 8 is an exemplary drawing illustrating a text input area after step S23 according to an embodiment of the disclosure. Referring to FIG. 8, an upper pseudo-image part may be a sequence of Unicode characters 161 including two Unicode characters of code point U+222B (CLDR name: INTEGRAL) and two Unicode characters of code point U+01AA (CLDR name: LATIN LETTER REVERSED ESH LOOP). For example, the sequence of Unicode characters 161 may be provided in a first text line 510 in the text input area 111. In some cases, the sequence of Unicode characters 161 may include appropriate number of blank Unicode characters (e.g., U+2000) at a beginning position, at an intermediate position, and/or at an end position of the sequence of Unicode characters 161. If a graphical concept represented by a pseudo-image is a human face, the sequence of Unicode characters 161 may represent hairs (e.g., four strands of hair) by their visual marks. In this case, as upper graphical objects, the two Unicode characters of code point U+222B may represent two left strands of hair, and the two Unicode characters of code point U+01 AA may represent two right strands of hair.

In some cases, a text input position 113 may be placed at the right of the sequence of Unicode characters 161 in the first text line 510 after the sequence of Unicode characters 161 is provided. However, a placement of the text input position 113 may vary according to a writing direction of the locale language. For example, if the locale language is English whose writing direction is LTR direction, then although there is, if any, a Unicode character in the sequence of Unicode characters 161 whose writing direction is RTL (right-to-left) direction, the text input position 113 may be placed at the right of the sequence of the Unicode characters 161 after the providing of the sequence of Unicode characters 161 regardless of the RTL direction.

In step S25, at least one word in a locale language may be provided in the text input area 111 in response to at least one letter key input corresponding to at least one letter key. For example, letter key inputs corresponding to "H" letter key, "a" letter key, "p" letter key, "p" letter key, and "y" letter key among the plurality of letter keys 210 may be sequentially input on the device 100. In some embodiments, if an auto-completion function of text as known in the art is implemented for the plurality of letter keys 210, the at least one letter key input may be sufficient with only a few letter key inputs among "H" letter key input, "a" letter key input, "p" letter key input, "p" letter key input, and "y" letter key input when trying to input "Happy" on the device 100.

Then, the device 100 may provide a plurality of Unicode characters associated with the locale language in the text input area 111 in response to the at least one letter key input. In some cases, the plurality of Unicode characters associated with the locale language may be sequentially provided in the text input area 111. For example, each of the plurality of Unicode characters associated with the locale language may be provided one by one in response to each of the at least one letter key input. Additionally, or alternatively, the plurality of Unicode characters associated with the locale language may be provided in the text input area 111 all at once due to an auto-completion function known in the art. In any cases, the plurality of Unicode characters associated with the locale language includes one or more words in the locale language as illustrated in FIG. 9.

Figure 9:
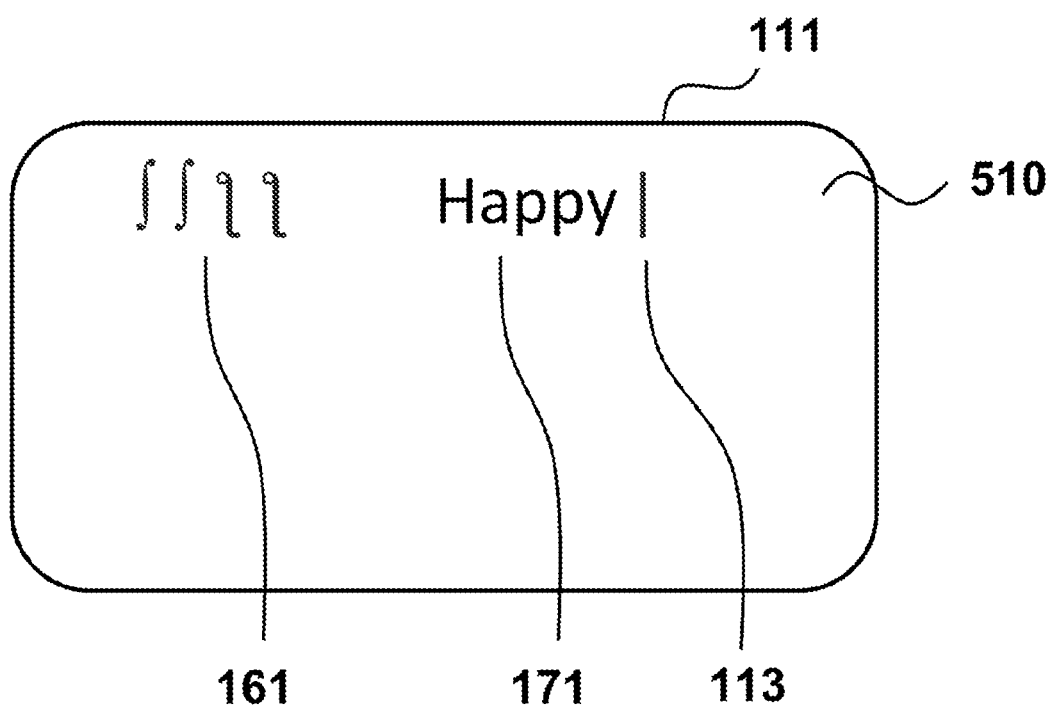
FIG. 9 is an exemplary drawing illustrating a text input area after step S25 according to an embodiment of the disclosure.

FIG. 9 is an exemplary drawing illustrating a text input area after step S25 according to an embodiment of the disclosure. Referring to FIG. 9, for example, a word "Happy" 171 may be provided in the text input area 111 in response to the at least one letter key input. In this case, the word "Happy" 171 may be after the sequence of Unicode characters 161 in the first text line 510 with respect to a writing direction of English.

In step S27, a lower pseudo-image part may be provided in the text input area in response to a second image-part key input corresponding to a second image-part key. For example, a second image-part key may be the second image-part key 230b in FIG. 7. However, in some cases, a second image-part key may be any one of the image-part keys 230b-230d associated with a pseudo-image part whose visual marks represent, for example, a part of a face lower than a "hair" part of the face, when provided in the text input area 111. Then, the device 100 may provide a first lower pseudo-image part in the text input area 111 in response to the second image-part key input as illustrated in FIG. 10.

Figure 10:
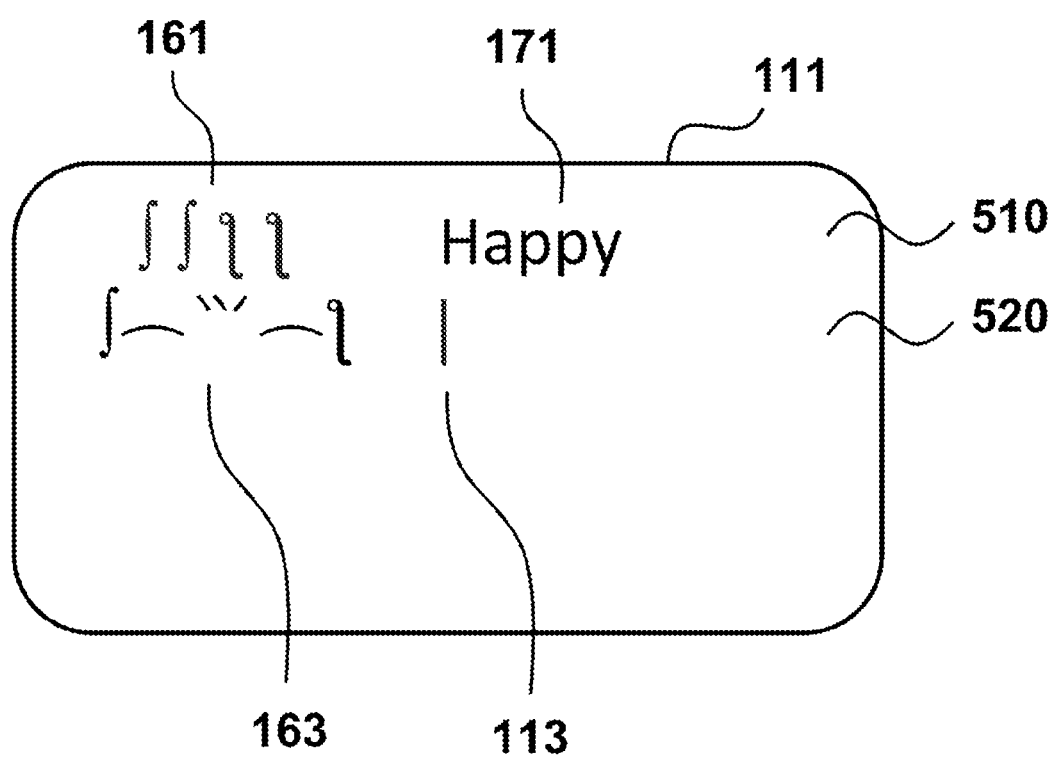
FIG. 10 is an exemplary drawing illustrating a text input area after step S27 according to an embodiment of the disclosure.

FIG. 10 is an exemplary drawing illustrating a text input area after step S27 according to an embodiment of the disclosure. Referring to FIG. 10, a first lower pseudo-image part may be a sequence of Unicode characters 163 including a Unicode character of code point U+222B, a Unicode character of code point U+01 AA, a Unicode character of code point U+2E8D (CLDR name: CJK RADICAL SMALL TWO), and two Unicode characters of code point U+2322 (CLDR name: FROWN).

In some embodiments, the sequence of Unicode characters 163 may further include a new-line Unicode character (e.g., U+000A) at, for example, a beginning position of the sequence of Unicode characters 163 so that the sequence of Unicode characters 163 is represented in a second text line 520 below the first text line 510. Alternatively, the new-line Unicode character may be input in the text input area 111 by a separate key input (e.g., a key input on a return key 220 in FIG. 3) between step S25 and step S27. Alternatively, due to a restriction of count of characters displayed in a single text line 510 of the text input area 111, and due to the length of the sequence of Unicode characters 163 longer than the count restriction, the sequence of Unicode characters 163 may be represented in the second text line 520 below the first text line 510. In any cases, the sequence of Unicode characters 163 may be represented in the second text line 520 right below the first text line 510.

If Unicode characters in the sequence of Unicode characters 163 are arranged in an appropriate order with or without blank Unicode characters such as in FIG. 10, then, as first lower graphical objects, a Unicode character of code point U+222B may represent a left strand of hair, two Unicode characters of code point U+2322 may represent left and right eyebrows, a Unicode character of code point U+2E8D may represent a middle of the eyebrows, and a Unicode character of code point U+01 AA may represent a right strand of hair. These Unicode characters represent a part of a face lower than "hairs" 161 in the first text line 510. Also, a word "Happy" 171 in English may be placed before the part 163 of the face with respect to a writing direction of English as in FIG. 10.

In some embodiments, steps S25 and S27 may be further repeated, but not necessarily, one or more times after the step S27. For example, in step S25 again, one or more letter key inputs corresponding to keys among the plurality of letter keys 210 may be input on the device 100. For example, letter key inputs corresponding to "B" letter key, "i" letter key, "r" letter key, "t" letter key, "h" letter key, "d" letter key, "a" letter key, and "y" letter key among the plurality of letter keys may be sequentially input on the device 100. Alternatively, if an auto-completion function is implemented for the plurality of letter keys, the one or more letter key inputs may be sufficient with only a few letter key inputs among "B" letter key input, "i" letter key input, "r" letter key input, "t" letter key input, "h" letter key input, "d" letter key input, "a" letter key input, and "y" letter key input when trying to input "Birthday" on the device 100.

Then, the device 100 may provide a plurality of Unicode characters associated with the locale language in the text input area 111 in response to the one or more letter key inputs. The plurality of Unicode characters associated with the locale language may include one or more words in the locale language as in FIG. 11.

Figure 11:
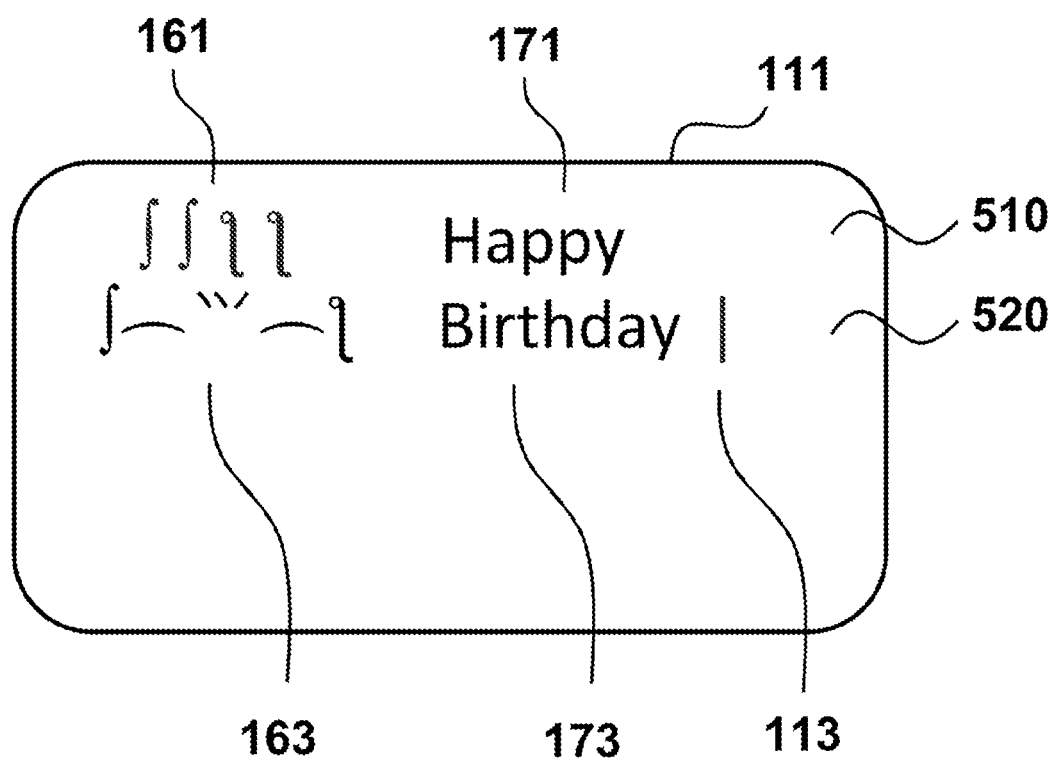
FIG. 11 is an exemplary drawing illustrating a text input area after step S25 again according to an embodiment of the disclosure.

FIG. 11 is an exemplary drawing illustrating a text input area after step S25 again according to an embodiment of the disclosure. Referring to FIG. 11, for example, a word "Birthday" 173 may be provided in the text input area 111 in response to the one or more letter key inputs. In this case, the word "Birthday" 173 may be after the sequence of Unicode characters 163 in the second text line 520 with respect to a writing direction of English.

In step S27 again, a third image-part key input corresponding to a third image-part key may be input on the device 100. For example, a third image-part key may be the third image-part key 230c in FIG. 7. However, in some cases, a third image-part key may be any one of the image-part keys 230c-230d associated with a pseudo-image part whose visual marks represent, for example, a part of a face lower than a "eyebrows" part of the face, when provided in the text input area 111. In any cases, the device 100 may provide a second lower pseudo-image part in the text input area 111 in response to the third image-part key input as in FIG. 12.

Figure 12:
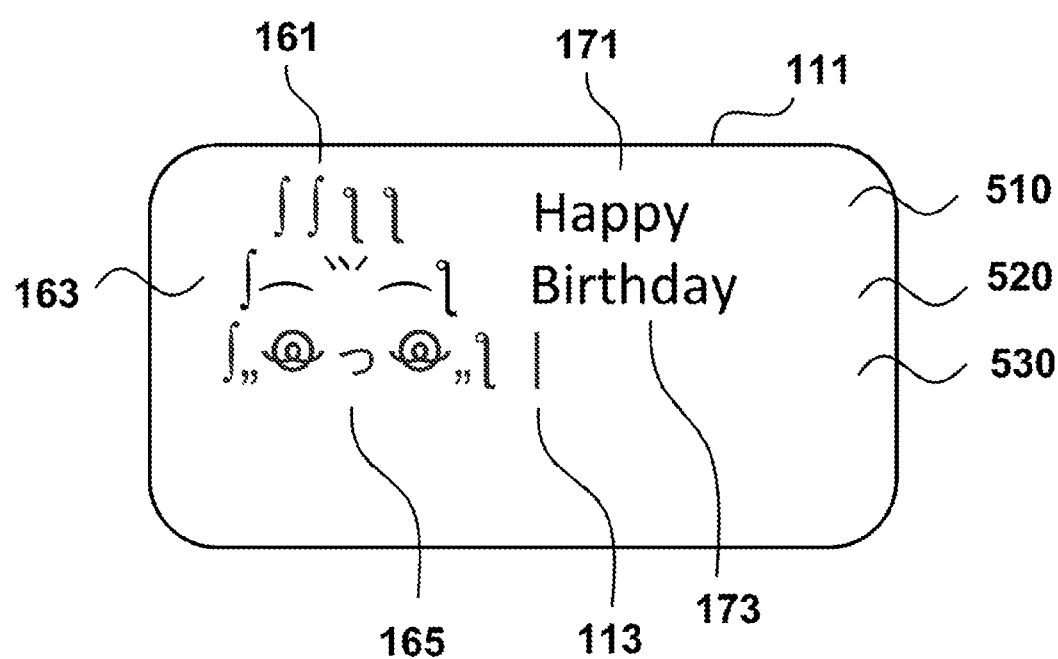
FIG. 12 is an exemplary drawing illustrating a text input area after step S27 again according to an embodiment of the disclosure.

FIG. 12 is an exemplary drawing illustrating a text input area after step S27 again according to an embodiment of the disclosure. Referring to FIG. 12, a second lower pseudo-image part, which is lower than the sequence of Unicode characters 163, may be a sequence of Unicode characters 165 including a Unicode character of code point U+222B, a Unicode character of code point U+0 IAA, two Unicode characters of code point U+201E (CLDR name: DOUBLE LOW-9 QUOTATION MARK), a Unicode character of code point U+3063 (CLDR name: HIRAGANA LETTER SMALL TU), and two Unicode characters of code point U+A598 (CLDR name: VAI SYLLABLE HUN).

In some embodiments, the sequence of Unicode characters 165 may further include a new-line Unicode character (e.g., U+000A) at, for example, a beginning position of the sequence of Unicode characters 165 so that the sequence of Unicode characters 165 is represented in a third text line 530 below the second text line 520. Alternatively, the new-line Unicode character may be input in the text input area 111 by a separate key input (e.g., a key input on a return key 220 in FIG. 3) between steps S25 and S27 again. Alternatively, due to a restriction of count of characters displayed in a single text line 520 of the text input area 111, and due to the length of the sequence of Unicode characters 165 longer than the count restriction, the sequence of Unicode characters 165 may be represented in the third text line 530 below the second text line 520. In any cases, the sequence of Unicode characters 165 may be represented in the third text line 530 right below the second text line 520.

If Unicode characters in the sequence of Unicode characters 165 are arranged in an appropriate order with or without blank Unicode characters such as in FIG. 12, then, as second lower graphical objects, a Unicode character of code point U+222B may represent a left strand of hair, two Unicode characters of code point U+201E may represent left and right flushes in cheeks, two Unicode characters of code point U+A598 may represent left and right eyes, a Unicode character of code point U+3063 may represent a nose, and a Unicode character of code point U+01AA may represent a right strand of hair. These Unicode characters may represent a part of a face lower than "hairs and eyebrows" 163 in the second text line 520. Also, a word "Birthday" 173 in English may be placed before the part 165 of the face with respect to a writing direction of English as in FIG. 12.

In some embodiments, steps S25 and S27 may be yet further repeated, but not necessarily, after step S27 again. For example, in step S25 further again, one or more letter key inputs corresponding to keys among the plurality of letter keys 210 may be input on the device 100. For example, one or more letter key inputs corresponding to "F" letter key, "r" letter key, "i" letter key, "e" letter key, "n" letter key, and "d" letter key among the plurality of letter keys 210 may be sequentially input on the device 100. Alternatively, if an auto-completion function is implemented for the plurality of letter keys, the one or more letter key inputs may be sufficient with only a few letter key inputs among "F" letter key input, "r" letter key input, "i" letter key input, "e" letter key input, "n" letter key input, and "d" letter key input when trying to input "Friend" on the device 100.

Then, the device 100 may provide a plurality of Unicode characters associated with the locale language in the text input area 111 in response to the one or more letter key inputs. The plurality of Unicode characters associated with the locale language may include one or more words in the locale language as in FIG. 13.

Figure 13:
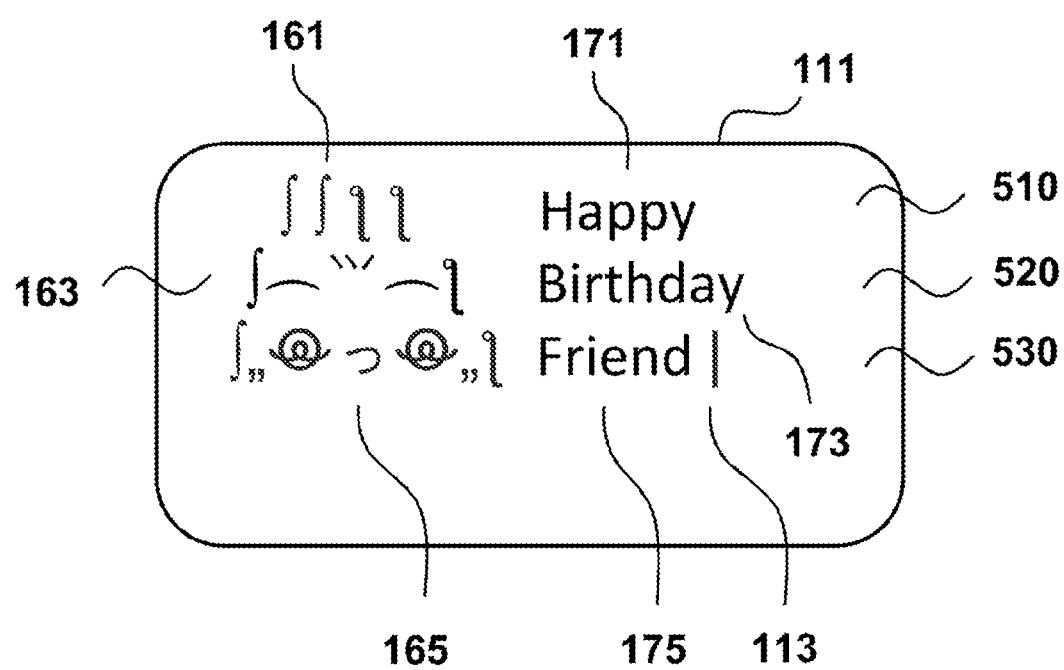
FIG. 13 is an exemplary drawing illustrating a text input area after step S25 further again according to an embodiment of the disclosure.

FIG. 13 is an exemplary drawing illustrating a text input area after step S25 further again according to an embodiment of the disclosure. Referring to FIG. 13, for example, a word "Friend" 175 may be provided in the text input area 111 in response to the one or more letter key inputs. In this case, the word "Friend" 175 may be after the sequence of Unicode characters 165 in the third text line 530 with respect to a writing direction of English.

In step S27 further again, a fourth image-part key input corresponding to a fourth image-part key may be input on the device 100. For example, a fourth image-part key may be the fourth image-part key 230d in FIG. 7. In this case, the fourth image-part key may be associated with a pseudo-image part whose visual marks represent, for example, a part of a face lower than a "nose and eyes" part of the face, when provided in the text input area 111. Then, the device 100 may provide a third lower pseudo-image part in the text input area 111 in response to the fourth image-part key input as in FIG. 14.

FIG. 14 is an exemplary drawing illustrating a text input area after step S27 further again according to an embodiment of the disclosure. Referring to FIG. 14, a third lower pseudo-image part, which is lower than the sequence of Unicode characters 165, may be a sequence of Unicode characters 167 including a Unicode character of code point U+31CF (CLDR name: CJK STROKE N), a Unicode character of code point U+15DC (CLDR name: CANADIAN SYLLABICS CARRIER THU), a Unicode character of code point U+2D70 (CLDR name: TIFINAGH SEPARATOR MARK).

In some embodiments, the sequence of Unicode characters 167 may further include a new-line Unicode character (e.g., U+000A) at, for example, a beginning position of the sequence of Unicode characters 167 so that the sequence of Unicode characters 167 is represented in a fourth text line 540 below the third text line 530. Alternatively, the new-line Unicode character may be input in the text input area 111 by a separate key input (e.g., a key input on a return key 220 in FIG. 3) between steps S25 and S27 further again. Alternatively, due to a restriction of count of characters displayed in a single text line 530 of the text input area 111, and due to the length of the sequence of Unicode characters 167 longer than the count restriction, the sequence of Unicode characters 167 may be represented in the fourth text line 540 below the third text line 530. In any cases, the sequence of Unicode characters 167 may be represented in the fourth text line 540 right below the third text line 530.

If Unicode characters in the sequence of Unicode characters 167 are arranged in an appropriate order with or without blank Unicode characters such as in FIG. 14, then, as third lower graphical objects, a Unicode character of code point U+31CF may represent a left chin, a Unicode character of code point U+15DC may represent an opening mouth, and a Unicode character of code point U+2D70 may represent a right chin. These Unicode characters represent a part of a face lower than a "nose and eyes" 165 in the third text line 530. Also, a word "Friend" 175 in English may be located before the part 167 of the face with respect to a writing direction of English as in FIG. 14.

As discussed above referring to FIGS. 7-14, the device 100 may provide pseudo-image parts 161, 163, 165, and 167 with the English words 171, 173, and 175 therebetween across multiple text lines 510, 520, 530, and 540 in the text input area 111 simply by receiving image-part key inputs multiple times in the keyboard area 115.

Such image-part key inputs do not require additional user actions, such as individual copies-and-pastes of Unicode characters included in pseudo-image parts 161, 163, 165 and 167. In contrast, without the image-part key inputs associated with pseudo-image parts 161, 163, 165 and 167, it may be required to copy an individual Unicode character included in pseudo-image parts 161, 163, 165 and 167 from a separate website (specifically from a web browser or web browsing application), or copy an individual Unicode character included in pseudo-image parts 161, 163, 165 and 167 from a screen of a separate mobile application not providing a text input functionality into the text input area 111, and then, to set the text input position 113 at a desired text input position in the text input area 111 to paste the copied individual Unicode character, and then, to switch a screen into a keyboard screen in order to input letters in English. Consequently, these necessary actions may distract or disturb a user's attention on the text input area 111.

Although a graphical concept of a human face is represented using four image-part key inputs in FIGS. 7-14, it should be noted that a count of the image-part key inputs may differ according to embodiments. For example, a graphical concept of a human face may be represented by two image-part key inputs, three image-part key inputs, and so on. In addition, although a graphical concept of a human face is represented in four text lines 510, 520, 530, and 540 in the text input area 111 in FIGS. 7-14, a count of text lines that a graphical concept may be represented is not limited thereto. A graphical concept may be represented over any number of text lines more than one text line based on the size of the graphical concept to be represented in the text input area 111.

Figure 15:
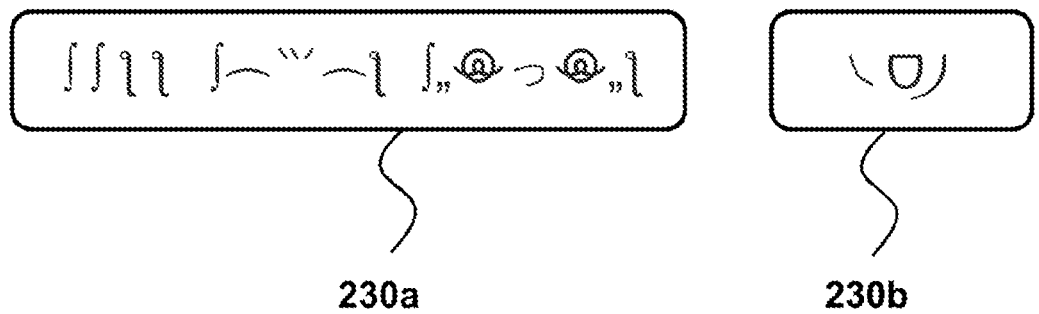
FIG. 15 is an exemplary drawing that multiple image-part keys have their own identification labels.

FIG. 15 is an exemplary drawing that multiple image-part keys have their own identification labels. Referring to FIG. 15, a first image-part key 230*a* may include, for example, four Unicode characters of code point U+222B (CLDR name: INTEGRAL), four Unicode characters of code point U+01AA (CLDR name: LATIN LETTER REVERSED ESH LOOP), a Unicode character of code point U+2E8D (CLDR name: CJK RADICAL SMALL TWO), two Unicode characters of code point U+2322 (CLDR name: FROWN), two Unicode characters of code point U+201E (CLDR name: DOUBLE LOW-9 QUOTATION MARK), a Unicode character of code point U+3063 (CLDR name: HIRAGANA LETTER SMALL TU), and two Unicode characters of code point U+A598 (CLDR name: VAI SYLLABLE HUN) as its identification label. If a graphical concept represented by a pseudo-image is a human face, these Unicode characters (in an appropriate order) with or without appropriate blanks (e.g., whitespaces, new-lines) may represent "hairs, eyebrows, a middle of the eyebrows, eyes, flushes in cheeks, and a nose" in the text input area 111 as discussed below.

A second image-part key 230*b* may include, for example, a Unicode character of code point U+31CF (CLDR name: CJK STROKE N), a Unicode character of code point U+15DC (CLDR name: CANADIAN SYLLABICS CARRIER THU), a Unicode character of code point U+2D70 (CLDR name: TIFINAGH SEPARATOR MARK) as its identification label. If a graphical concept represented by a pseudo-image is a human face, these Unicode characters with or without appropriate blanks may represent "chins and a mouth" in the text input area 111 as discussed below.

Referring to FIG. 6 and FIG. 15, in step S23, a first image-part key input corresponding to a first image-part key may be input on the device 100. For example, a first image-part key may be the first image-part key 230*a* in FIG. 15. Then, the device 100 may provide an upper pseudo-image part in the text input area 111 in response to the first image-part key input as in FIG. 16.

Figure 16:
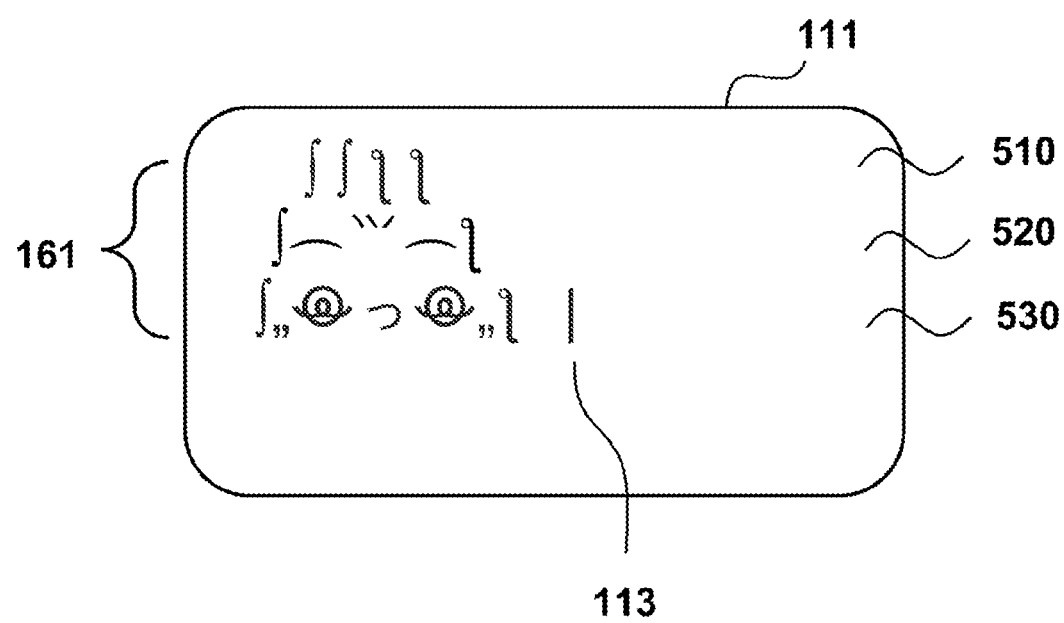
FIG. 16 is an exemplary drawing illustrating a text input area after step S23 according to an embodiment of the disclosure.

FIG. 16 is an exemplary drawing illustrating a text input area after step S23 according to an embodiment of the disclosure. Referring to FIG. 16, for example, an upper pseudo-image part may be a sequence of Unicode characters 161 including two Unicode characters of code point U+222B and two Unicode characters of code point U+01 AA that are located in a first text line 510, a Unicode character of code point U+222B, a Unicode character of code point U+01AA, a Unicode character of code point U+2E8D and two Unicode characters of code point U+2322 that are located in a second text line 520, and a Unicode character of code point U+222B, a Unicode character of code point U+01AA, two Unicode characters of code point U+201E, a Unicode character of code point U+3063 and two Unicode characters of code point U+A598 that are located in a third text line 530.

The upper pseudo-image part may further include a new-line Unicode character between a final position in the first text line 510 and a beginning position in the second text line 520, and a new-line Unicode character between a final position in the second text line 520 and a beginning position in the third text line 530 so that the upper pseudo-image part is represented from the first text line 510 to the third text line 530. Additionally, or alternatively, the upper pseudo-image part may further include appropriate number of blank Unicode characters between a final position in the first text line 510 and a beginning position in the second text line 520, and appropriate number of blank Unicode characters between a final position in the second text line 520 and a beginning position in the third text line 530 so that the upper pseudo-image part is represented from the first text line 510 to the third text line 530.

If a graphical concept represented by a pseudo-image is a human face, then, as upper graphical objects, visual marks of the sequence of Unicode characters 161 may represent hairs (e.g., four strands of hair) in the first text line 510, hairs (two strands at left and right), eyebrows and a middle of the eyebrows in the second text line 520, and hairs (two strands at left and right), eyes, flushes in cheeks, and a nose in the third text line 530. In this case, the Unicode characters of code point U+222B (CLDR name: INTEGRAL) may represent left strands of hair, the Unicode characters of code point U+01AA (CLDR name: LATIN LETTER REVERSED ESH LOOP) may represent right strands of hair, the Unicode character of code point U+2E8D (CLDR name: CJK RADICAL SMALL TWO) may represent a middle of eyebrows, the Unicode characters of code point U+2322 (CLDR name: FROWN) may represent left and right eyebrows, the Unicode characters of code point U+201E (CLDR name: DOUBLE LOW-9 QUOTATION MARK) may represent left and right flushes in cheeks, the Unicode character of code point U+3063 (CLDR name: HIRAGANA LETTER SMALL TU) may represent a nose, the Unicode characters of code point U+A598 (CLDR name: VAI SYLLABLE HUN) may represent left and right eyes.

In some embodiments, the sequence of Unicode characters 161 may further include one or more blank Unicode characters in the first text line 510, the second text line 520, and/or the third text line 530 in order to appropriately arrange non-blank Unicode characters in the sequence of Unicode characters 161.

Referring to FIG. 6 again, in step S25, one or more letter key inputs corresponding to keys among the plurality of letter keys 210 may be input on the device 100. For example, letter key inputs corresponding to "L" letter key, "o" letter key, "v" letter key, "e" letter key, "i" letter key, and "t" letter key among the plurality of letter keys 210 may be sequentially input on the device 100. In some embodiments, if an auto-completion function as known in the art is implemented for the plurality of letter keys, the letter key inputs may be sufficient with only a few letter key inputs among "L" letter key input, "o" letter key input, "v" letter key input, "e" letter key input, "i" letter key input, and "t" letter key input when trying to input "Love it" on the device 100. In some cases, a space key input corresponding to a space key (e.g., a space key 225 in FIG. 3) may be further input between any two letter key inputs.

Then, the device 100 may provide a plurality of Unicode characters associated with the locale language in the text input area 111 in response to the letter key inputs. The plurality of Unicode characters associated with the locale language may include one or more words in the locale language as in FIG. 17.

Figure 17:
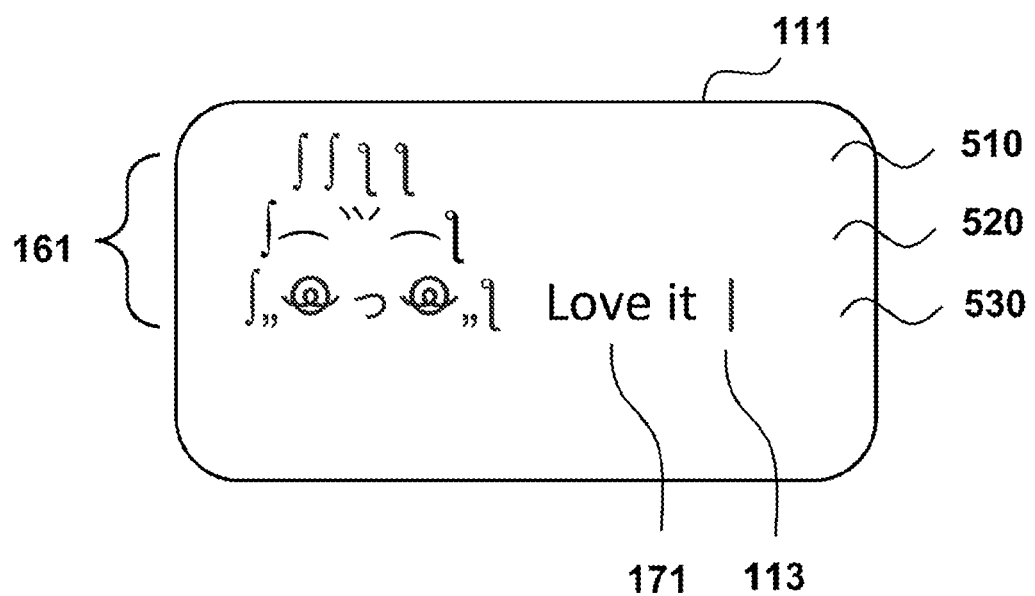
FIG. 17 is an exemplary drawing illustrating a text input area after step S25 according to an embodiment of the disclosure.

FIG. 17 is an exemplary drawing illustrating a text input area after step S25 according to an embodiment of the disclosure. Referring to FIG. 17, for example, words "Love it" 171 may be provided in the text input area 111 in response to the letter key inputs, one character by one letter key input, and/or two or more characters by one key input (with or without a space key input) in case of an auto-completion function. In this case, the words "Love it" 171 may be after the sequence of Unicode characters 161 in the third text line 530 with respect to a writing direction of English.

Referring to FIG. 6 again, in step S27, a second image-part key input corresponding to a second image-part key may be input on the device 100. For example, a second image-part key may be the second image-part key 230b in FIG. 15. For example, the second image-part key may be associated with a pseudo-image part whose visual marks represent a part of a face lower than a "nose and eyes" part of the face, when provided in the text input area 111. Then, the device 100 may provide a lower pseudo-image part in the text input area 111 in response to the second image-part key input as in FIG. 18.

Figure 18:
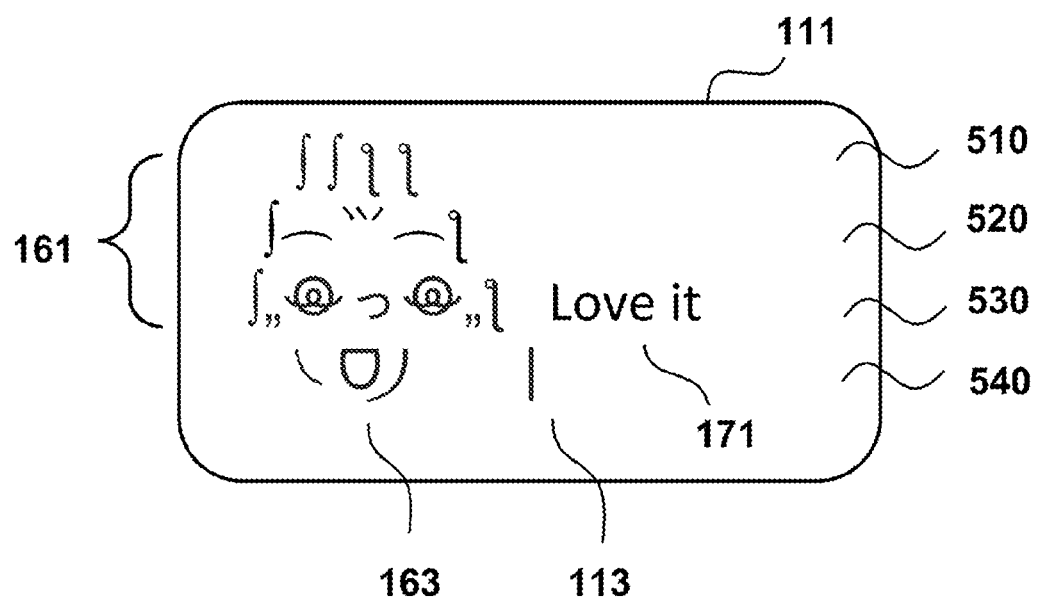
FIG. 18 is an exemplary drawing illustrating a text input area after step S27 according to an embodiment of the disclosure.

FIG. 18 is an exemplary drawing illustrating a text input area after step S27 according to an embodiment of the disclosure. Referring to FIG. 18, for example, a lower pseudo-image part may be a sequence of Unicode characters 163 including a Unicode character of code point U+31CF (CLDR name: CJK STROKE N), a Unicode character of code point U+15DC (CLDR name: CANADIAN SYLLABICS CARRIER THU), and a Unicode character of code point U+2D70 (CLDR name: TIFINAGH SEPARATOR MARK) in the fourth text line 540.

If a graphical concept represented by a pseudo-image is a human face, then, as lower graphical objects, visual marks of the sequence of Unicode characters 163 may represent a mouth between a left chin and a right chin. For example, the Unicode character of code point U+31CF may represent a left chin, the Unicode character of code point U+15DC may represent a mouth, and the Unicode character of code point U+2D70 may represent a right chin.

In some embodiments, the sequence of Unicode characters 163 may further include one or more blank Unicode characters in order to appropriately arrange non-blank Unicode characters in the sequence of Unicode characters 163. In some embodiments, a count of text lines that the upper pseudo-image part 161 is provided in the text input area 111 may be different from a count of text lines that the lower pseudo-image part 163 is provided.

In some embodiments, the sequence of Unicode characters 163 may further include a new-line Unicode character (e.g., U+000A) at, for example, a beginning position of the sequence of Unicode characters 163 so that the sequence of Unicode characters 163 is represented in a fourth text line 540 below the third text line 530. Alternatively, the new-line Unicode character may be input in the text input area 111 by a separate key input (e.g., a key input on a return key 220 as in FIG. 3) between step S25 and step S27. Alternatively, due to a restriction of count of characters displayed in a single text line 530 of the text input area 111, and due to the length of the sequence of Unicode characters 163 longer than the count restriction, the sequence of Unicode characters 163 may be represented in the fourth text line 540 below the third text line 530. In any cases, the sequence of Unicode characters 163 may be represented in the fourth text line 540 right below the third text line 530.

In FIG. 18, the words 171 with the pseudo-image parts 161 and 163 may represent a facial expression and/or an emotion not only by a literal meaning of the words 171 but also by a pseudo-image (161 plus 163) representing a graphical concept of a human face. It should be noted that a facial expression represented by the pseudo-image (161 plus 163) may be varied based on elemental Unicode characters for eyebrows, eyes, mouth, and so on in the pseudo-image parts 161 and 163. That is, the device 100 may be allowed to change an elemental Unicode character in a pseudo-image by a selection from candidate Unicode characters.

Figure 19:
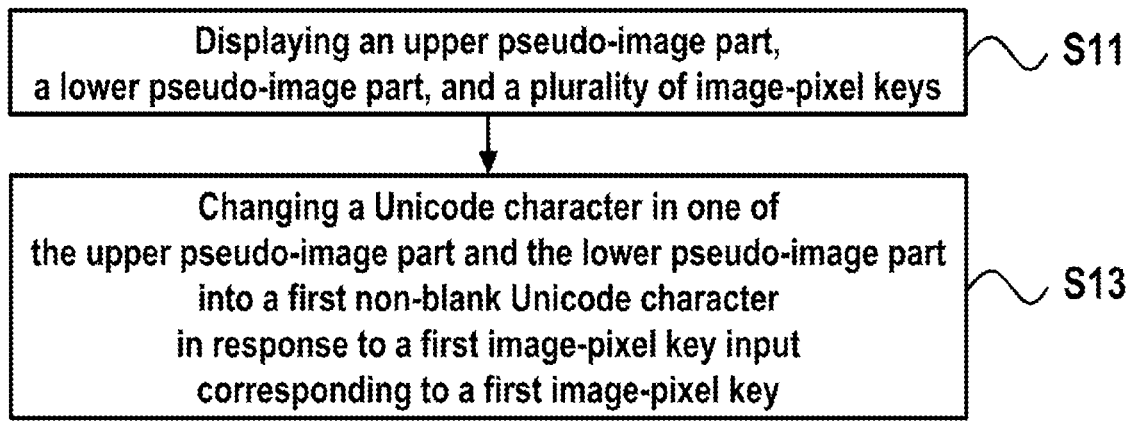
FIG. 19 is a flow chart illustrating a part of a method for inputting characters before step S21 according to an embodiment of the disclosure.

FIG. 19 is a flow chart illustrating a part of a method for inputting characters before step S21 according to an embodiment of the disclosure. Referring to FIG. 19, before the displaying the multiple keys in the first screen of the keyboard area (i.e., before step S21 in FIG. 6), the method may further include a step S11 of displaying an upper pseudo-image part, a lower pseudo-image part, and a plurality of image-pixel keys in a second screen of the keyboard area, and a step S13 of changing at least one Unicode character in one of the upper pseudo-image part and the lower pseudo-image part into a first non-blank Unicode character in response to a first image-pixel key input corresponding to a first image-pixel key.

In step S11, the device 100 may display an upper pseudo-image part, a lower pseudo-image part, and a plurality of image-pixel keys in a second screen of the keyboard area 111. In the disclosure, an "image-pixel key" refers to a key associated with at least one non-blank candidate Unicode character that may be included in a pseudo-image. Herein, a "candidate Unicode character" refers to a Unicode character that may be included in a pseudo-image, but not necessarily included in the pseudo-image. Each of the plurality of image-pixel keys may be associated with one or more candidate Unicode characters that may be included in the pseudo-image.

Figure 20:
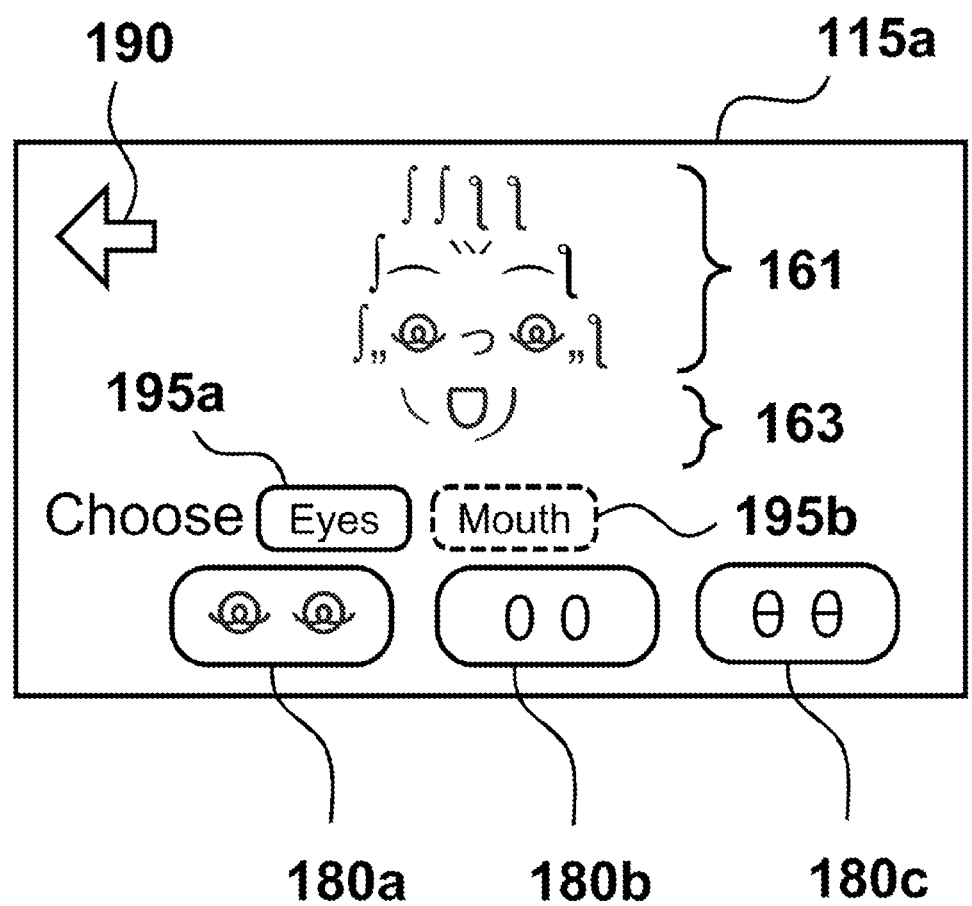
FIG. 20 and FIG. 21 are exemplary drawings respectively illustrating a second screen of a keyboard area according to embodiments of the disclosure.
Figure 21:
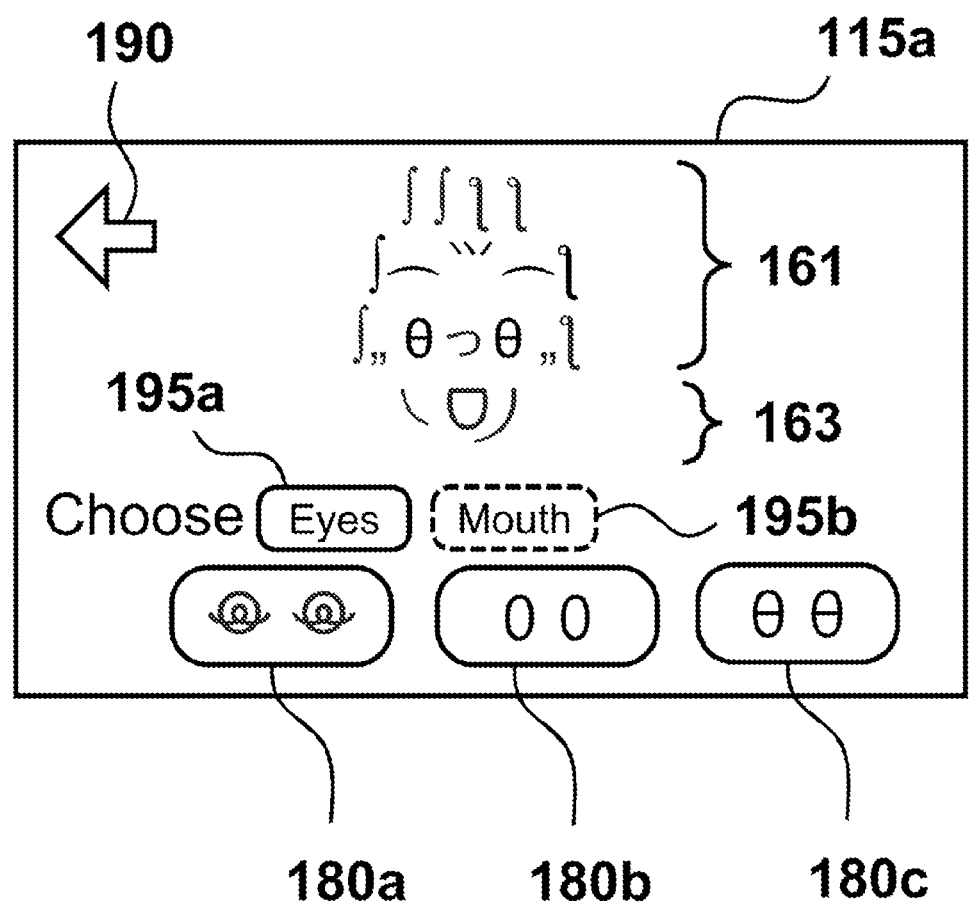

FIG. 20 and FIG. 21 are exemplary drawings respectively illustrating a second screen of a keyboard area according to embodiments of the disclosure. For example, referring to FIGS. 20-21, a second screen of the keyboard area 115a may display three image-pixel keys 180a, 180b, and 180c that may represent "eyes" of a human face. For example, as their own identification labels indicate, a first image-pixel key 180a may be associated with a Unicode character of code point U+A598 (CLDR name: VAI SYLLABLE HUN), a second image-pixel key 180b may be associated with a Unicode character of code point U+0030 (CLDR name: DIGIT ZERO), and a third image-pixel key 180c may be associated with a Unicode character of code point U+03B8 (CLDR name: GREEK SMALL LETTER THETA). In this case, the one or more candidate Unicode characters may include the Unicode character of code point U+A598, the Unicode character of code point U+0030, and the Unicode character of code point U+03B8.

In some embodiments, the second screen of the keyboard area 115a may further display an upper pseudo-image part and a lower pseudo-image part. In this case, the upper pseudo-image part may be disposed above the lower pseudo-image part in a vertical direction in the second screen 115a. Referring to FIGS. 20-21, an upper pseudo-image part 161 and a lower pseudo-image part 163 may be displayed in the second screen 115a in an arrangement so that a user may expect a pseudo-image, to be represented later in the text input area 111, including the upper pseudo-image part 161 and the lower pseudo-image part 163.

In some embodiments, the image-pixel keys may be disposed below an upper pseudo-image part and a lower pseudo-image part in the second screen 115a. Referring to FIGS. 20-21, image-pixel keys 180a, 180b, and 180c are disposed below an upper pseudo-image part 161 and a lower pseudo-image part 163 in the second screen 115a. This arrangement in the second screen 115a makes it possible that the upper pseudo-image part 161 and the lower pseudo-image part 163 are not blocked in a user's perspective view by one or more fingers of the user when the user is trying to put a finger on one or more of the image-pixel keys 180a, 180b, and 180c.

In step S13, at least one Unicode character in one of the upper pseudo-image part and the lower pseudo-image part may be changed into a first non-blank Unicode character in response to a first image-pixel key input corresponding to a first image-pixel key among the plurality of image-pixel keys 180a-180c. The first image-pixel key may be associated with the first non-blank Unicode character. For example, a first image-pixel key which is input on the device 100 may be the third image-pixel key 180c in FIG. 20. In this case, a candidate Unicode character of code point U+03B8 associated with the third image-pixel key 180c may be "chosen" as an element in one of the upper pseudo-image part 161 and the lower pseudo-image part 163. If the candidate Unicode character of code point U+03B8 is chosen e.g., as an "eye" of a face in step S13, the upper pseudo-image part 161 including the "eye" part may be changed such as the second screen 115a displays in FIG. 21.

It should be noted that one of the upper pseudo-image part 161 and the lower pseudo-image part 163 may be changed in the second screen 115a based on a selection of a graphical object (e.g., an element of a human face) the chosen candidate Unicode character represents. In some embodiments, one or more selection keys 195a and 195b on graphical objects that enables a user to change an elemental Unicode character of one or more graphical objects in the upper pseudo-image part 161 and/or the lower pseudo-image part 163 may be further displayed in the second screen 115a. For example, when a selection key on "eyes" 195a is activated, a plurality of image-pixel keys associated with candidate "eye" Unicode characters may be displayed in the second screen 115a. In this case, an elemental Unicode character representing one of the "eyes" may be chosen in response to an image-pixel key input as illustrated in FIGS. 20-21.

After step S13, the second screen of the keyboard area 115a may be changed into the first screen of the keyboard area 115 in FIGS. 1-3. This screen change of the keyboard area 115,115a (e.g., a switching of the screen) may be performed in various ways. For example, if the second screen of the keyboard area 115a further displays a screen change key 190 as in FIGS. 20-21, then the second screen 115a may be changed into the first screen 115 in response to a key input corresponding to the screen change key 190. Additionally, or alternatively, if a key input is provided corresponding to any image-pixel key among the plurality of image pixel keys 180a-180c, then the second screen 115a may be changed into the first screen 115 after a predetermined time interval, such as one second. Then referring to FIG. 6 again, the first screen of the keyboard area 115 may display a plurality of letter keys 210 and a plurality of image-part keys 230 in step S21. And steps S21-S27 may be performed as discussed above.

Figure 22:
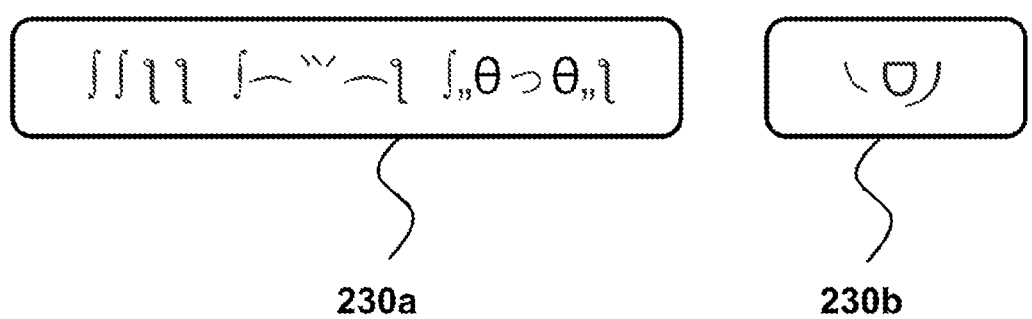
FIG. 22 is an exemplary drawing that multiple image-part keys have their own identification labels.
Figure 23:
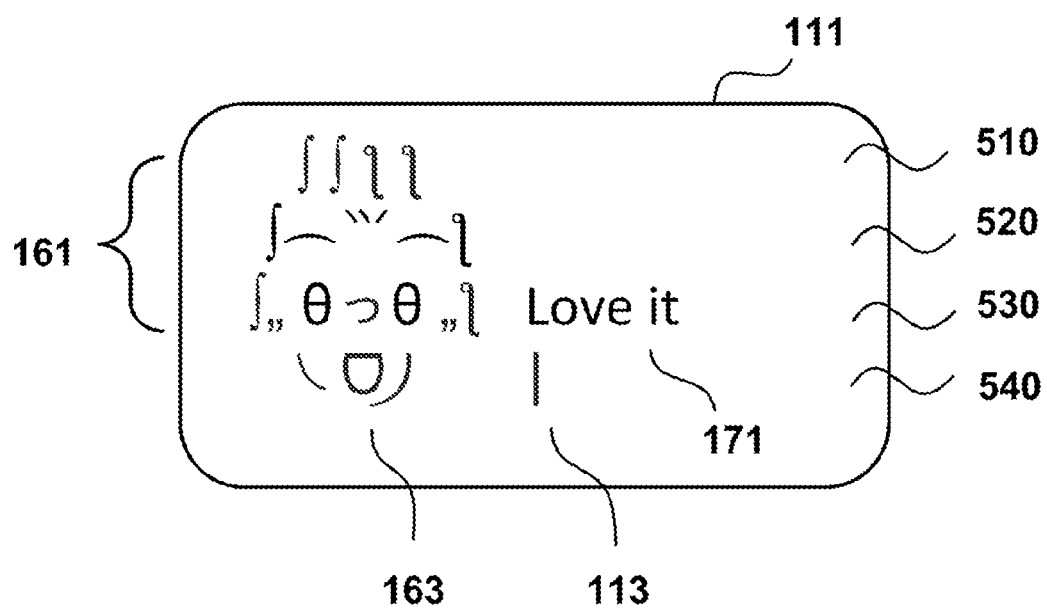
FIG. 23 is an exemplary drawing illustrating a text input area after step S27 according to an embodiment of the disclosure.

FIG. 22 is an exemplary drawing that multiple image-part keys have their own identification labels. FIG. 23 is an exemplary drawing illustrating a text input area after step S27 according to an embodiment of the disclosure. Referring to FIG. 22, an identification label of a first image-part key 230a may include the candidate Unicode character of code point U+03B8 rather than the Unicode character of code point U+A598 in FIG. 15 after the candidate Unicode character of code point U+03B8 is chosen as an eye of a face in step S13. Also, referring to FIG. 23, after the candidate Unicode character of code point U+03B8 is chosen as an eye of a face in step S13, an upper pseudo-image part 161 including this changed eye may be provided in the text input area 111.

Although a candidate Unicode character is illustrated above for an eye, it should be noted that any candidate Unicode character may be chosen to change an upper pseudo-image part and/or a lower pseudo-image part. For example, appropriate candidate Unicode characters for hairs, eyebrows, flushes in cheeks, a nose, a mouth, etc. may be chosen to change pseudo-image parts. Here, "appropriate" does not mean that any Unicode character may be arbitrarily chosen to represent a part of a human face. In contrast, in order to represent a part of a face, a candidate Unicode character should have its visual marks equal to, similar to, and/or analogous to the very part of the face. Thus, the candidate Unicode characters may be predetermined and/or pre-selected from the whole Unicode characters in Unicode system, corresponding to a graphical object of a graphical concept that each of the candidate Unicode characters represents by its visual marks.

By changing any graphical object of a human face, a facial expression of the face may be altered. For example, when a candidate Unicode character is chosen for, e.g., an eye, an eyebrow, a mouth, and/or flush in cheeks, a facial expression of the face may be changed due to visual marks of the chosen Unicode character.

Figure 24:
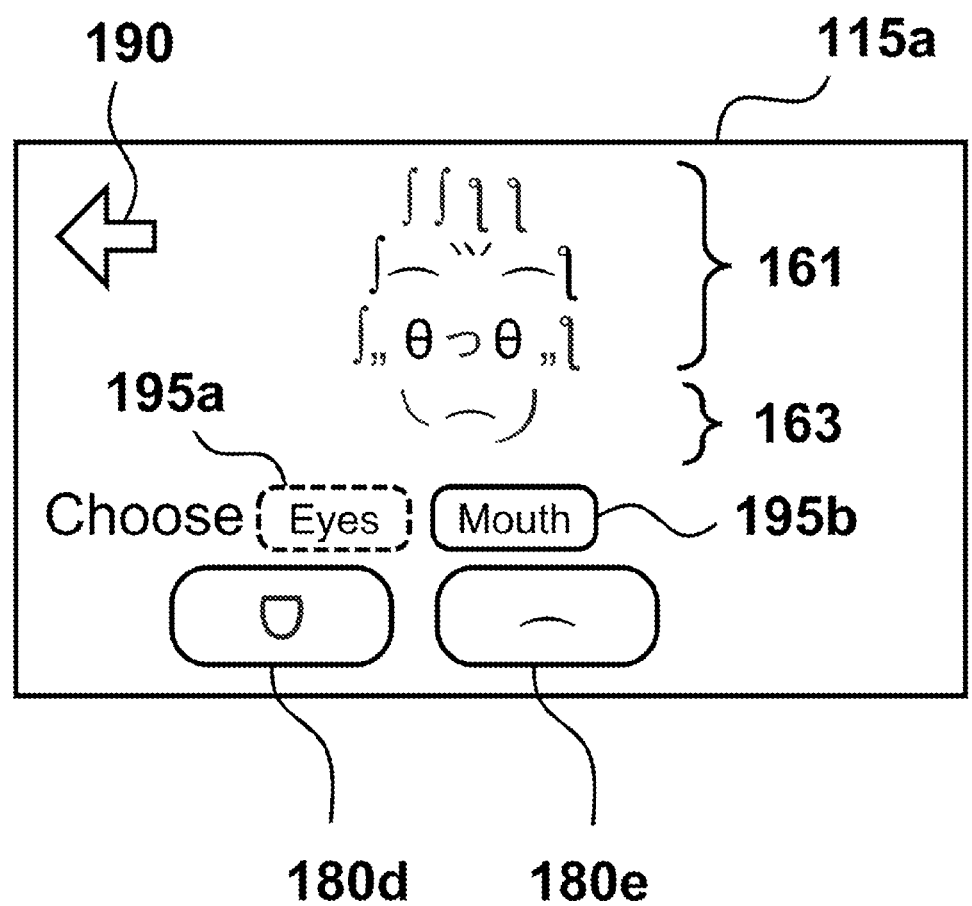
FIG. 24 is an exemplary drawing illustrating a second screen of a keyboard area according to an embodiment of the disclosure.

FIG. 24 is an exemplary drawing illustrating a second screen of a keyboard area according to an embodiment of the disclosure. Referring to FIG. 24, a second screen of the keyboard area 115a may include a first image-pixel key 180d and a second image-pixel key 180e corresponding to a mouth of a face. For example, the first image-pixel key 180*d* may be associated with a Unicode character of code point U+15DC (CLDR name: CANADIAN SYLLABICS CARRIER THU). The second image-pixel key 180*e* may be associated with a Unicode character of code point U+2322 (CLDR name: FROWN). If a selection key on a "mouth" 195*b* is activated, and if an image-pixel key input corresponding to the second image-pixel key 180*e* is input on the device 100 in step S13, then a lower pseudo-image part 163 may include the Unicode character of code point U+2322 rather than the Unicode character of code point U+15DC as a mouth. As a result, a facial expression of the face may be changed from a positive expression (e.g., happy, joyful, etc.) to a negative expression (e.g., sad, disappointed, etc.) as in FIG. 24 due to this Unicode character change corresponding to a mouth.

In some embodiments, a Unicode character may represent a graphical object of a graphical concept by relative relationships of positions that Unicode characters in a pseudo-image are arranged over multiple text lines. For example, when the pseudo-image represents a human face over four text lines 510, 520, 530 and 540 in the text input area 111 as in FIG. 23, Unicode characters of code point U+03B8 (CLDR name: GREEK SMALL LETTER THETA) arranged at both left and right of the Unicode character of code point U+3063 (CLDR name: HIRAGANA LETTER SMALL TU) (i.e., the Unicode character whose visual mark represents a "nose") in the third text line 530 may represent "eyes" as graphical objects of a face due to their horizontally symmetric (or substantially symmetric) arrangement with respect to the "nose" Unicode character. Also, Unicode characters of code point U+2322 (CLDR name: FROWN) arranged above the Unicode characters of U+03B8, and arranged at both left and right of the Unicode character of code point U+2E8D (CLDR name: CJK RADICAL SMALL TWO) (i.e., the Unicode character whose visual marks represent a "middle of eyebrows") in the second text line 520 may represent "eyebrows" as graphical objects of a face due to their horizontally symmetric (or substantially symmetric) arrangement with respect to the "middle of eyebrows" Unicode character, and due to a horizontal alignment of the "middle of eyebrows" Unicode character with the "nose" Unicode character in the text input area 111.

In some embodiments, a Unicode character may represent an "analogical" graphical object of a graphical concept by an arrangement of Unicode characters in the pseudo-image. In this case, the analogical representation may be accomplished due to an appropriate arrangement of Unicode characters in the pseudo-image in the text input area 111.

Figure 25:
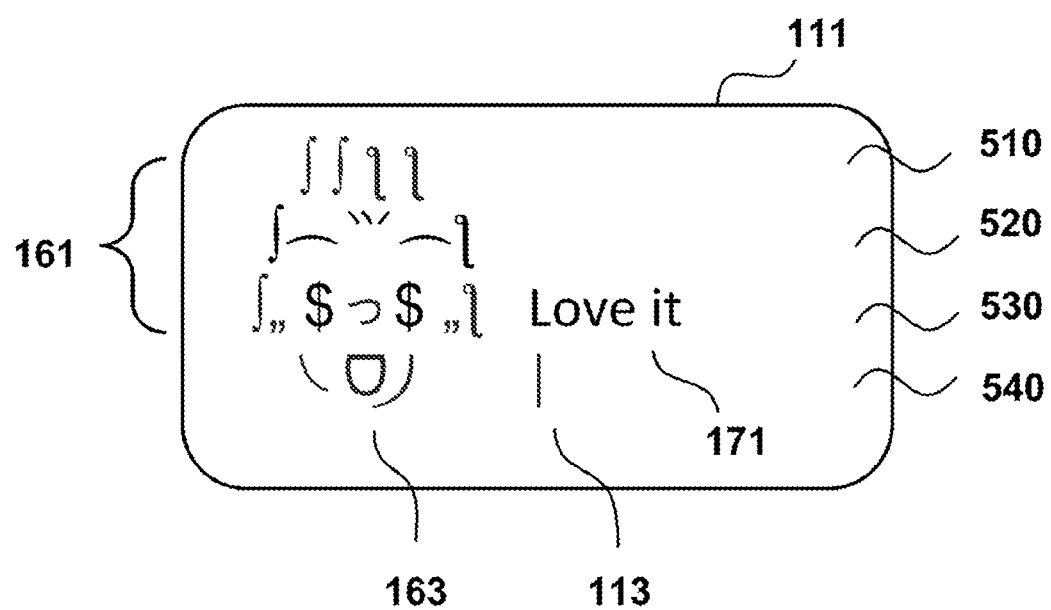
FIG. 25 and FIG. 26 are exemplary drawings respectively illustrating a text input area after step S27 according to embodiments of the disclosure.
Figure 26:
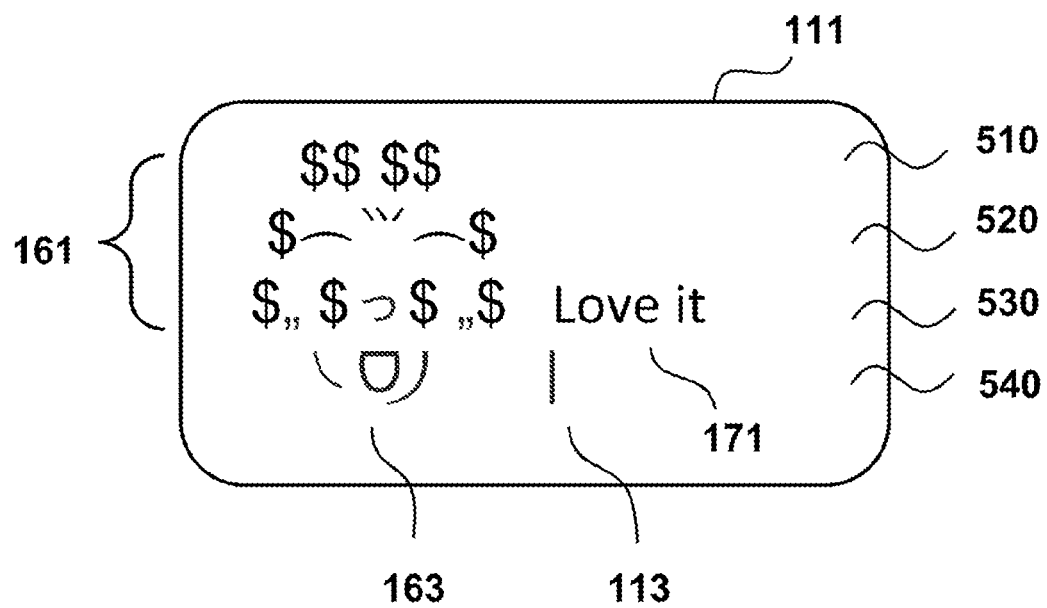

FIG. 25 and FIG. 26 are exemplary drawings respectively illustrating a text input area after step S27 according to embodiments of the disclosure. For example, referring to FIG. 25, when the pseudo-image represents a human face over four text lines 510, 520, 530 and 540 in the text input area 111, Unicode characters of code point U+0024 (CLDR name: DOLLAR SIGN) may be arranged at "eyes" positions in the third text line 530. Although real eyes of a human face neither equal to nor similar to visual marks of the Dollar sign, the Unicode characters of code point U+0024 may represent "eyes" by analogy due to their relative positions arranged in the pseudo-image.

Also, it should be noted that a single Unicode character of a given code point may represent a different graphical object of a graphical concept. For example, referring to FIG. 26, when the pseudo-image represents a human face over four text lines 510, 520, 530 and 540 in the text input area 111, a Unicode character of code point U+0024 (CLDR name: DOLLAR SIGN) may represent both "hairs" and "eyes" of a human face.

Figure 27:
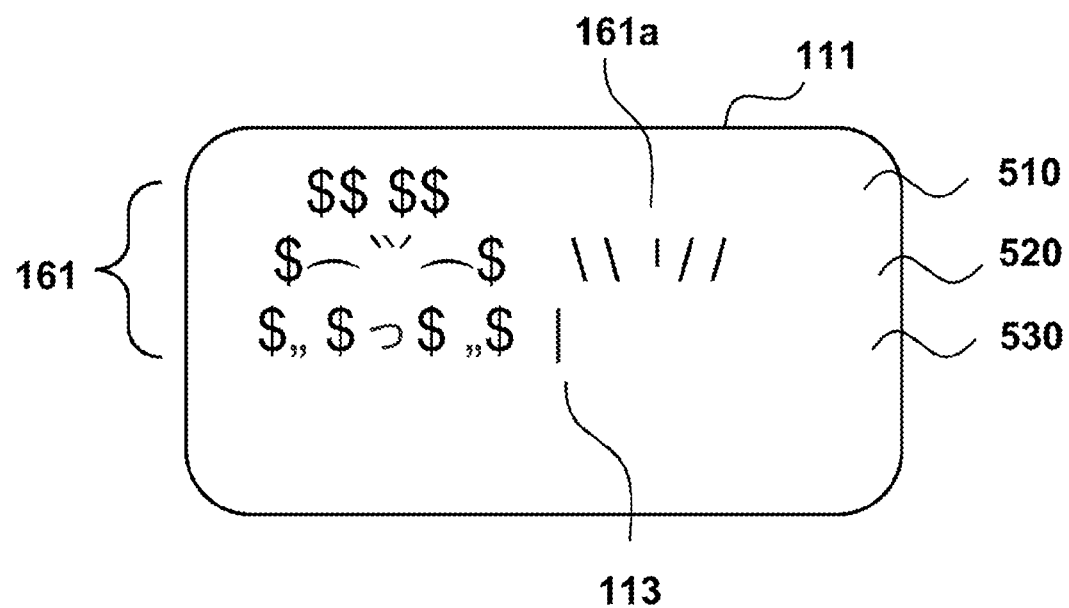
FIGS. 27, 28, and 29 are drawings illustrating a text input area after steps S23, S25, and S27 are performed, respectively.
Figure 28:
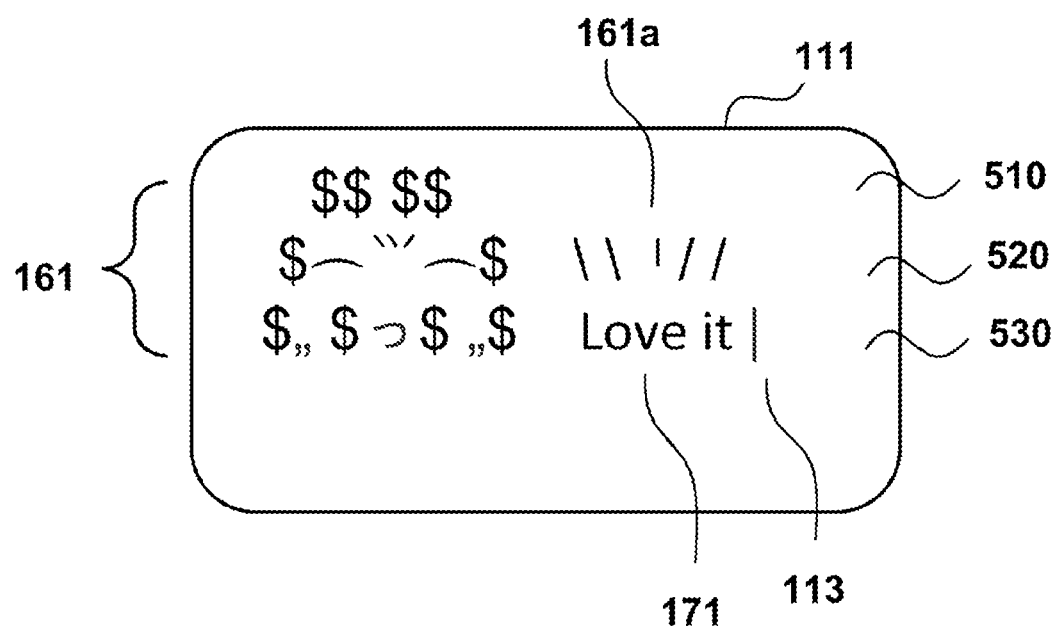
Figure 29:
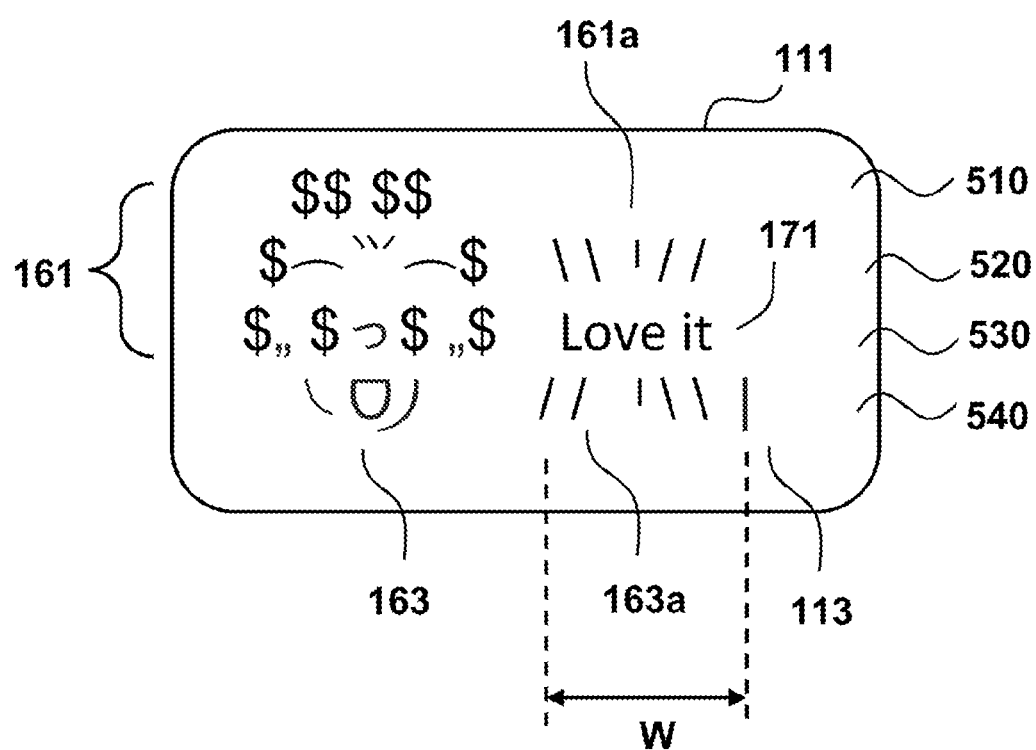

In some embodiments, one pseudo-image part may represent more than one graphical object in at least one text line in the text input area 111. FIGS. 27, 28, and 29 are drawings illustrating a text input area after steps S23, S25, and S27 are performed, respectively. For example, referring to FIG. 27, an upper pseudo-image part 161 may include Unicode characters representing an upper part of a human face, and Unicode characters representing an upper part of a "speech bubble" 161*a* arranged at right of the human face. The upper part of the speech bubble 161*a* may be represented by e.g., two Unicode characters of code point U+005C (CLDR name: REVERSE SOLIDUS), a Unicode character of code point U+02E1 (CLDR name: MODIFIER LETTER SMALL L), and two Unicode characters of code point U+002F (CLDR name: SOLIDUS) with appropriate number of blank Unicode characters.

Referring to FIG. 28, words "Love it" 171 may be provided after the upper pseudo-image part 161. In this case, the words 171 may be located below the upper part of the speech bubble 161*a*, and the words 171 (and/or a center of the words 171) may be substantially aligned with the upper part (and/or a center of the upper part) of the speech bubble 161*a* in a horizontal direction in the text input area 111.

Referring to FIG. 29, a lower pseudo-image part 163 may include Unicode characters representing a lower part of the human face, and Unicode characters representing a lower part of the speech bubble 163*a*. The lower part of the speech bubble 163*a* may be represented by e.g., two Unicode characters of code point U+002F, a Unicode character of code point U+02E1, and two Unicode characters of code point U+005C with appropriate number of blank Unicode characters.

Due to an arrangement of the words 171 between the upper part of the speech bubble 161*a* and the lower part of the speech bubble 163*a*, the "speech bubble" Unicode characters combined by the upper part 161*a* and the lower part 163*a* may represent an emphasis on the words 171 adjacent to and/or around the words 171. In this case, the words 171 may be located within a width W of the upper part of the speech bubble 161*a* and/or within a width W of the lower part of the speech bubble 163*a* in a horizontal direction of the text input area 111. Although the speech bubble 161*a* and 163*a* is illustrated as radiating solid lines from the words 171, a shape of the speech bubble 161*a* and 163*a* is not limited thereto. For example, a shape of the speech bubble 161*a* and 163*a* may be an arbitrary shape around the words 171 such as a circle, a rectangle, a rounded rectangle, an ellipse, an oval, or a combination thereof. Also, the speech bubble 161*a* and 163*a* may include various lines such as a solid line, a dashed line, a dash-dot line, a curved line, an angled line, or a combination thereof.

It should be noted again that, only two image-part key inputs may be sufficient to provide the pseudo-image parts 161 and 163 in the text input area 111 in FIG. 29, when ignoring letter key inputs corresponding to the words 171.

Although a pseudo-image is discussed above that represents a human face as a graphical concept, a graphical concept is not limited thereto that may be represented by a pseudo-image. For example, a graphical concept may include one or more of an animal, a natural scene (e.g., a scene on sky, a scene on water), a scene element, a building and so on.

Figure 30:
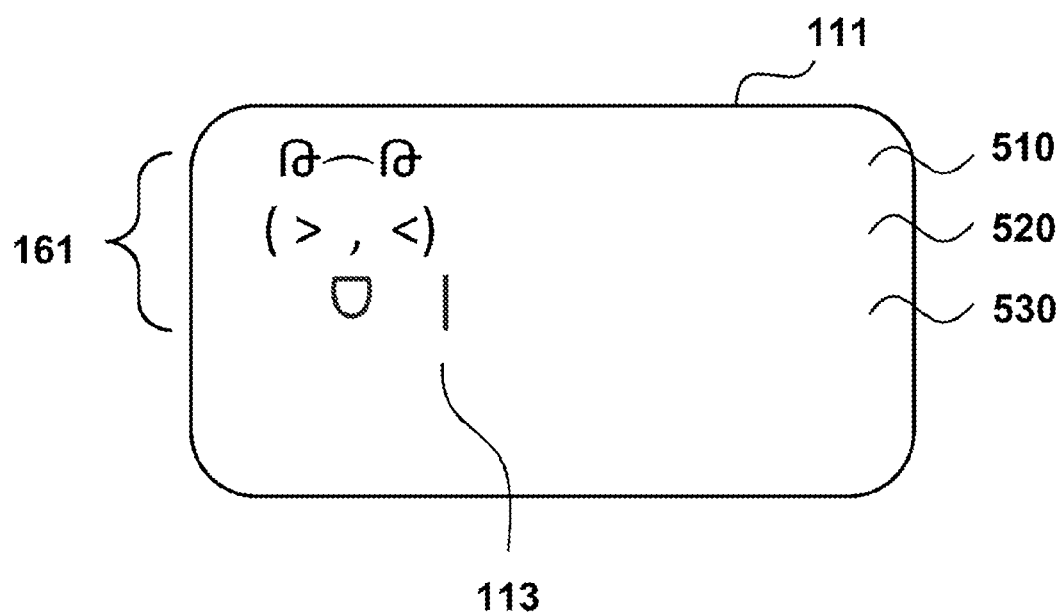
FIGS. 30, 31, and 32 are drawings illustrating a text input area after steps S23, S25, and S27 are performed, respectively.
Figure 31:
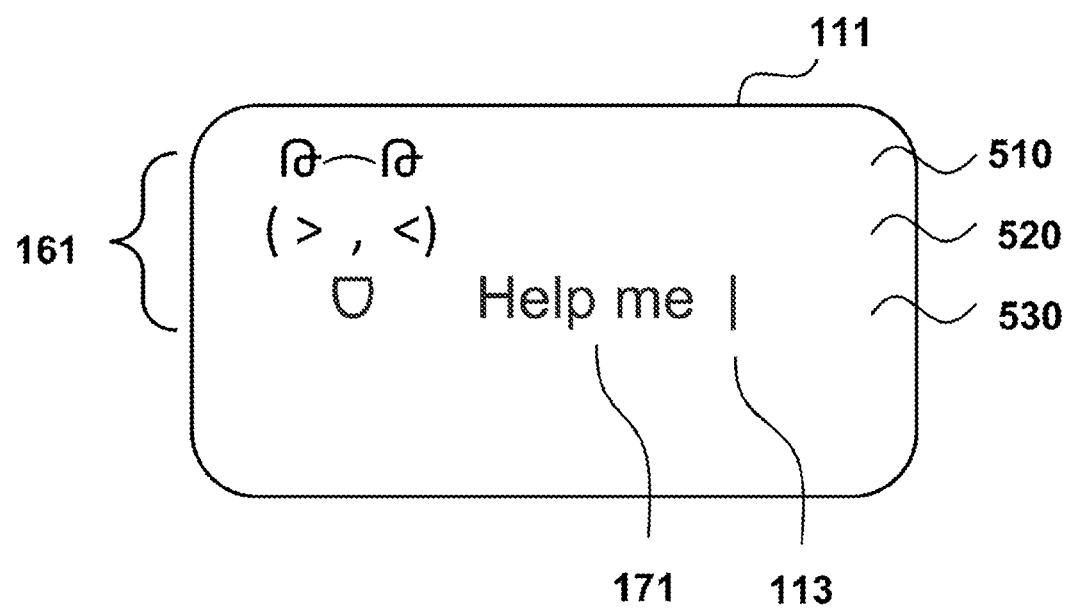
Figure 32:
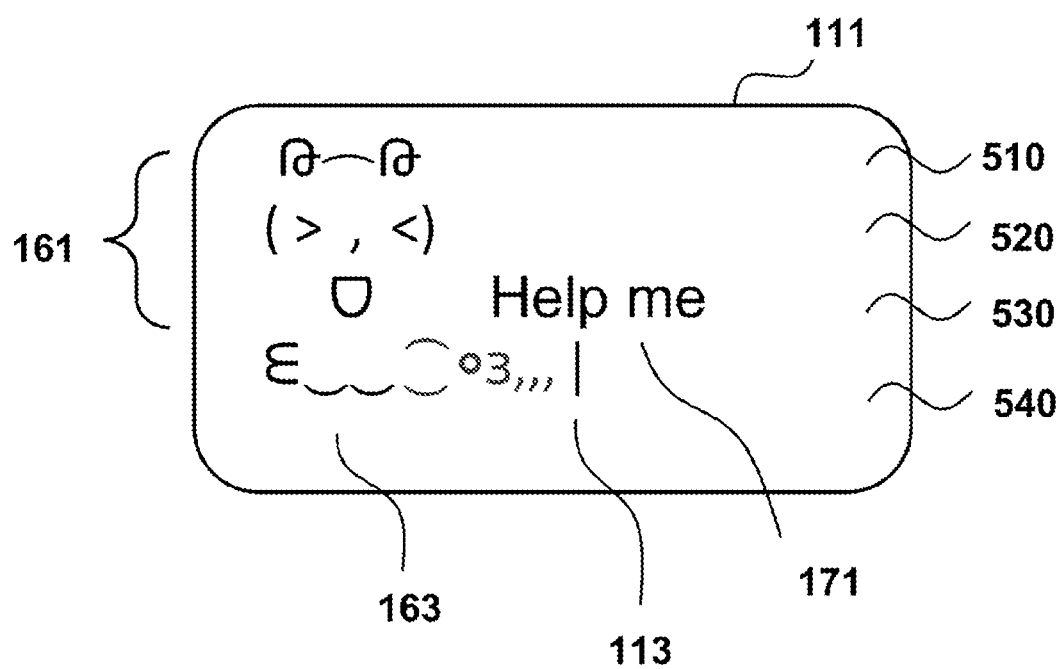

In some embodiments, a graphical concept may include an animal. FIGS. 30, 31, and 32 are drawings illustrating a text input area after steps S23, S25, and S27 are performed, respectively. Referring to FIG. 30, an upper pseudo-image part 161 may be provided in the text input area 111 in response to a first image-part key input. The upper pseudo-image part 161 may represent graphical objects such as a head of an animal (e.g., a rabbit). For example, two Unicode characters of code point U+0539 (CLDR name: ARMENIAN CAPITAL LETTER TO) may represent ears of the animal, and a Unicode character of code point U+2322 (CLDR name: FROWN) may represent an outline between ears in a first text line 510. For example, a Unicode character of code point U+0028 (CLDR name: LEFT PARENTHESIS) may represent a left outline of the head, a Unicode character of code point U+0029 (CLDR name: RIGHT PARENTHESIS) represent a right outline of the head, a Unicode character of code point U+003E (CLDR name: GREATER-THAN SIGN) may represent a left eye line, a Unicode character of code point U+003C (CLDR name: LESS-THAN SIGN) may represent a right eye line, and a Unicode character of code point U+002C (CLDR name: COMMA) may represent a nose in a second text line 520. For example, a Unicode character of code point U+15DC (CLDR name: CANADIAN SYLLABICS CARRIER THU) may represent a mouth in a third text line 530. In any text lines, appropriate number of blank Unicode characters and/or new-line Unicode characters may also be provided so that an arrangement of the above Unicode characters may represent a head.

Referring to FIG. 31, exemplary words "Help me" 171 may be provided after the upper pseudo-image part 161 in the text input area 111 in response to some letter key inputs. For example, the words 171 may be positioned in the same text line 530 as a lowermost text line that the upper pseudo-image part 161 is positioned in the text input area 111.

Referring to FIG. 32, a lower pseudo-image part 163 may be provided in the text input area 111 in response to a second image-part key input. The lower pseudo-image part 163 may represent graphical objects such as a foot, a tail, a body outline, and a motion line when provided in the text input area 111. For example, a Unicode character of code point U+15F4 (CLDR name: CANADIAN SYLLABICS CARRIER GA) may represent two forelegs, three Unicode characters of code point U+035C (CLDR name: COMBINING DOUBLE *BREVE* BELOW) and a Unicode character of code point U+0361 (CLDR name: COMBINING DOUBLE INVERTED *BREVE*) may represent body outlines, a Unicode character of code point U+0966 (CLDR name: DEVANAGARI DIGIT ZERO) may represent a tail, a Unicode character of code point U+0437 (CLDR name: CYRILLIC SMALL LETTER ZE) may represent two hind legs, and three Unicode characters of code point U+002C (CLDR name: COMMA) may represent motion lines after the hind legs in a fourth text line 540.

Referring to FIG. 32, exemplary words "Help me" 171 may be provided between the upper pseudo-image part 161 and the lower pseudo-image part 163 in the text input area 111. For example, the words 171 may be positioned in a text line 530 above the lower pseudo-image part 163 in the text input area 111. It should be noted again that, only two image-part key inputs may be sufficient to provide the pseudo-image parts 161 and 163 in the text input area 111, when ignoring letter key inputs corresponding to the words 171.

Although not discussed here in detail, one skilled in the art would recognize that any elemental Unicode character in the animal may be changed by displaying image-pixel keys and then receiving an image-pixel key input as discussed above referring to FIG. 21 and FIG. 24.

Figure 33:
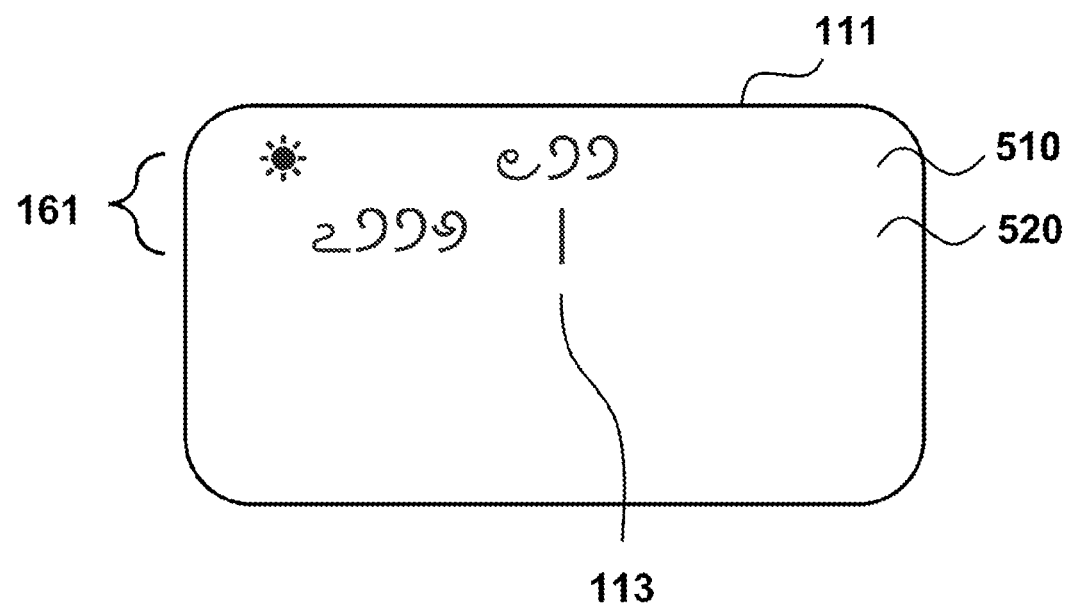
FIGS. 33, 34, and 35 are drawings illustrating a text input area after steps S23, S25, and S27 are performed, respectively.
Figure 34:
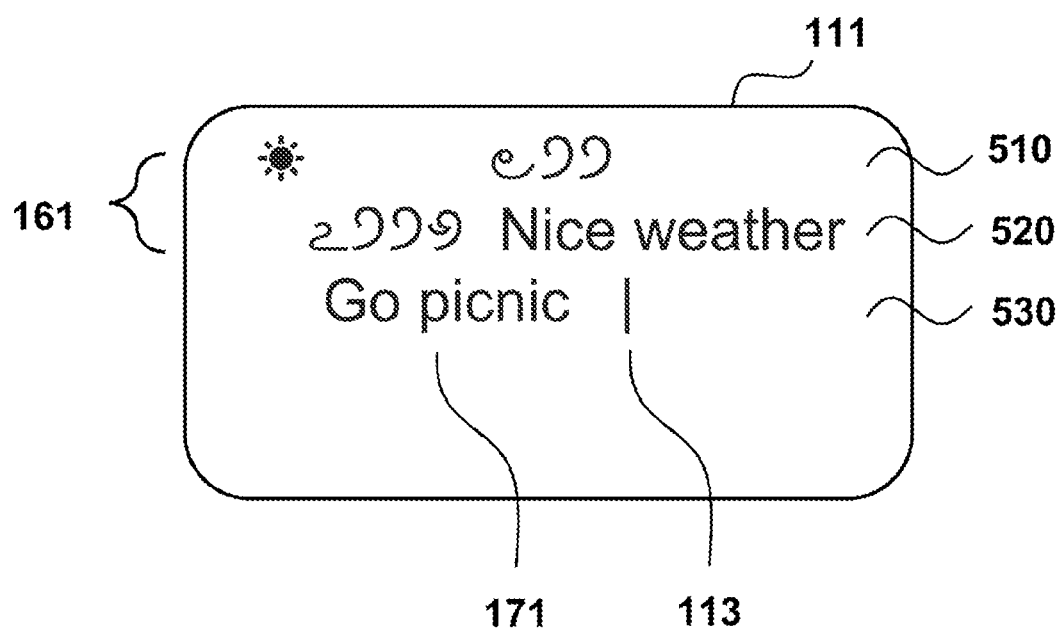
Figure 35:
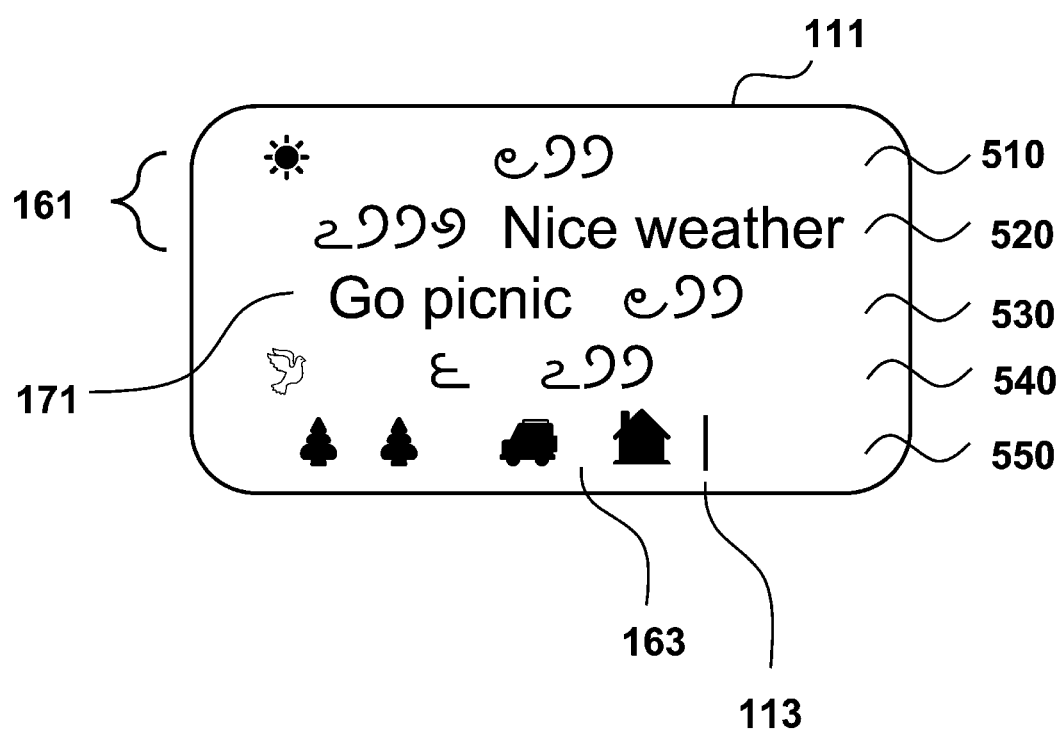

In some embodiments, a graphical concept may include a natural scene (e.g., a scene on sky). FIGS. 33, 34, and 35 are drawings illustrating a text input area after steps S23, S25, and S27 are performed, respectively. Referring to FIG. 33, an upper pseudo-image part 161 may be provided in the text input area 111 in response to a first image-part key input. The upper pseudo-image part 161 may represent graphical objects such as a sun and a cloud. For example, a Unicode character of code point U+2600 (CLDR name: BLACK SUN WITH RAYS) may represent a sun in a natural scene, a Unicode character of code point U+0C7F (CLDR name: TELUGU SIGN TUUMU) may represent an outline of a cloud in the natural scene, and two Unicode characters of code point U+0A6D (CLDR name: GURMUKHI DIGIT SEVEN) may represent outlines of the cloud in the natural scene in a first text line 510. For example, a Unicode character of code point U+0C3D (CLDR name: TELUGU SIGN AVAGRAHA) may represent an outline of a cloud below the sun, two Unicode characters of code point U+0A6D may represent outlines of the cloud below the sun, and a Unicode character of code point U+0B6C (CLDR name: ORIYA DIGIT SIX) may represent an outline of the cloud below the sun in a second text line 520. In some embodiments, appropriate number of blank Unicode characters may be included in the first text line 510 and/or the second text line 520.

Referring to FIG. 34, exemplary words "Nice weather Go picnic" 171 may be provided after the upper pseudo-image part 161 in the text input area 111 in response to some letter key inputs. In some cases, appropriate number of space key inputs and/or a return key input may be further input in order to provide the words 171 across the second text line 520 and the third text line 530. In this case, at least one word of the words 171 may be positioned in the same text line 530 as a lowermost text line that the upper pseudo-image part 161 is positioned in the text input area 111.

Referring to FIG. 35, a lower pseudo-image part 163 may be provided in the text input area 111 in response to a second image-part key input. The lower pseudo-image part 163 may represent graphical objects such as a cloud, a wind, an animal, a plant, a building, and a vehicle. For example, a Unicode character of code point U+0C7F (CLDR name: TELUGU SIGN TUUMU) may represent an outline of a cloud in the natural scene, and two Unicode characters of code point U+0A6D (CLDR name: GURMUKHI DIGIT SEVEN) may represent outlines of the cloud in a third text line 530. For example, an emoji Unicode character of code point U+1F54A (CLDR name: DOVE OF PEACE) may represent an animal (e.g., a bird) in the natural scene, a Unicode character of code point U+0C6C (CLDR name: TELUGU DIGIT SIX) may represent a wind, a Unicode character of code point U+0C3D (CLDR name: TELUGU SIGN AVAGRAHA) may represent an outline of a cloud, and two Unicode characters of code point U+0A6D may represent outlines of the cloud in a fourth text line 540. Appropriate number of blank Unicode characters and/or a new-line Unicode character may be included in the third text line 530 and the fourth text line 540.

In some cases, one or more emoji Unicode characters may be included in the lower pseudo-image part 163. For example, two emoji Unicode characters of code point U+1F332 (CLDR name: EVERGREEN TREE) may represent plants (e.g., trees), an emoji Unicode character of code point U+1F699 (CLDR name: RECREATIONAL VEHICLE) may represent a vehicle (e.g., a car), and an emoji Unicode character of code point U+1F3E0 (CLDR name: HOUSE BUILDING) may represent a building (e.g., a house building) in a fifth text line 550. Although emoji Unicode characters in FIG. 35 is illustrated in black and white, one or more emoji Unicode characters may be displayed in color when provided in the text input area 111.

Although not discussed here in detail, one skilled in the art may recognize that any elemental Unicode character in the natural scene may be changed by displaying image-pixel keys and then receiving an image-pixel key input as discussed above referring to FIG. 21 and FIG. 24. For example, the natural scene illustrated in FIGS. 33-35, may be altered by changing one or more scene elements (e.g., a sun, a cloud, an animal, etc.) into other scene elements (e.g., a moon, a star, a rain, a snow, etc.).

Figure 36:
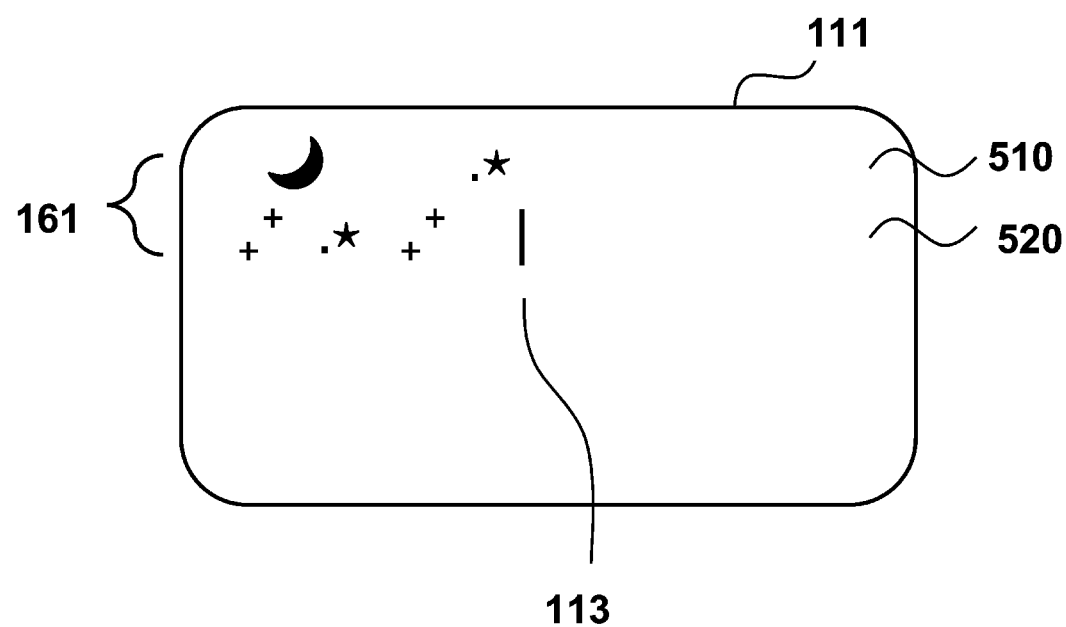
FIGS. 36, 37, and 38 are drawings illustrating a text input area after steps S23, S25, and S27 are performed, respectively.
Figure 37:
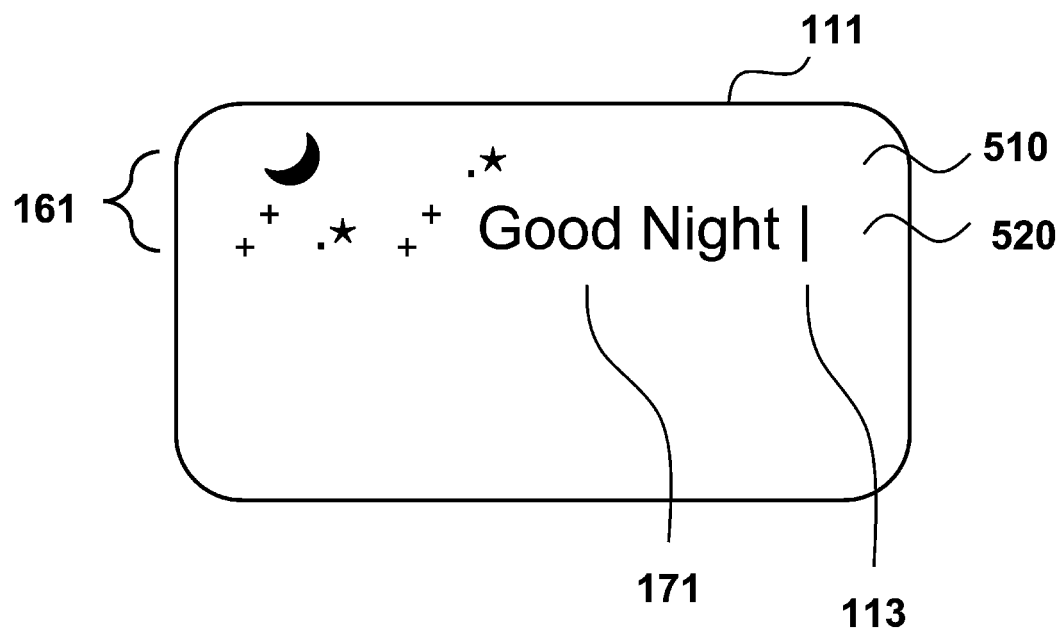
Figure 38:
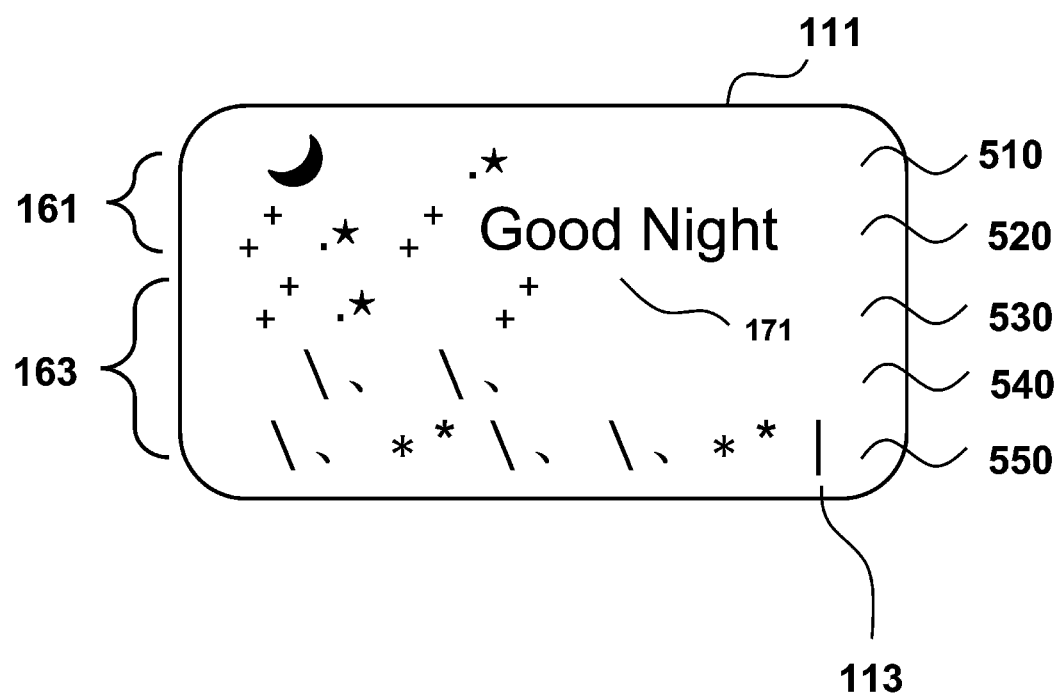

FIGS. 36, 37, and 38 are drawings illustrating a text input area after steps S23, S25, and S27 are performed, respectively. Referring to FIG. 36, an upper pseudo-image part 161 may be provided in the text input area 111 in response to a first image-part key input. The upper pseudo-image part 161 may represent graphical objects such as a moon and a star. For example, an emoji Unicode character of code point U+1F319 (CLDR name: CRESCENT MOON) may represent a moon in a natural scene, a Unicode character of code point U+2024 (CLDR name: ONE DOT LEADER) may represent a star, and a Unicode character of code point U+22C6 (CLDR name: STAR OPERATOR) may represent another star in a first text line 510. For example, two Unicode characters of code point U+208A (CLDR name: SUBSCRIPT PLUS SIGN) may represent stars, two Unicode characters of code point U+207A (CLDR name: SUPERSCRIPT PLUS SIGN) may represent other stars, a Unicode character of code point U+2024 may represent another star, and a Unicode character of code point U+22C6 may represent yet another star in a second text line 520. Appropriate number of blank Unicode characters and/or a new-line Unicode character may be included in the first text line 510 and/or the second text line 520.

Referring to FIG. 37, exemplary words "Good Night" 171 may be provided after the upper pseudo-image part 161 in the text input area 111 in response to some letter key inputs. In some cases, at least one word of the words 171 may be positioned in the same text line 520 as a lowermost text line that the upper pseudo-image part 161 is positioned in the text input area 111.

Referring to FIG. 38, a lower pseudo-image part 163 may be provided in the text input area 111 in response to a second image-part key input. The lower pseudo-image part 163 may represent graphical objects such as a star, a rain, and a snow. For example, two Unicode characters of code point U+208A (CLDR name: SUBSCRIPT PLUS SIGN) may represent stars, two Unicode characters of code point U+207A (CLDR name: SUPERSCRIPT PLUS SIGN) may represent other stars, a Unicode character of code point U+2024 (CLDR name: ONE DOT LEADER) may represent another star, a Unicode character of code point U+22C6 (CLDR name: STAR OPERATOR) may represent yet another star in a third text line 530. For example, two Unicode characters of code point U+FF3C (CLDR name: FULLWIDTH REVERSE SOLIDUS) may represent rain drops, two Unicode characters of code point U+3001 (CLDR name: IDEOGRAPHIC COMMA) may represent other rain drops in a fourth text line 540. For example, three Unicode characters of code point U+FF3C may represent rain drops, three Unicode characters of code point U+3001 may represent other rain drops, two Unicode characters of code point U+2217 (CLDR name: ASTERISK OPERATOR) may represent snowflakes, and two Unicode characters of code point U+002A (CLDR name: ASTERISK) may represent other snowflakes in a fourth text line 540. Appropriate number of blank Unicode characters and/or a new-line Unicode character may be included in the third text line 530, the fourth text line 540, and/or the fifth text line 550.

Although not discussed here in detail, one skilled in the art would recognize that any elemental Unicode character in the natural scene may be changed by displaying image-pixel keys and then receiving an image-pixel key input as discussed above referring to FIG. 21 and FIG. 24. For example, the natural scene illustrated in FIGS. 36-38, may be altered by changing one or more scene elements (e.g., a moon, a star, a rain, a snow, etc.) into other scene elements (e.g., a wave, a water bubble, etc.).

Figure 39:
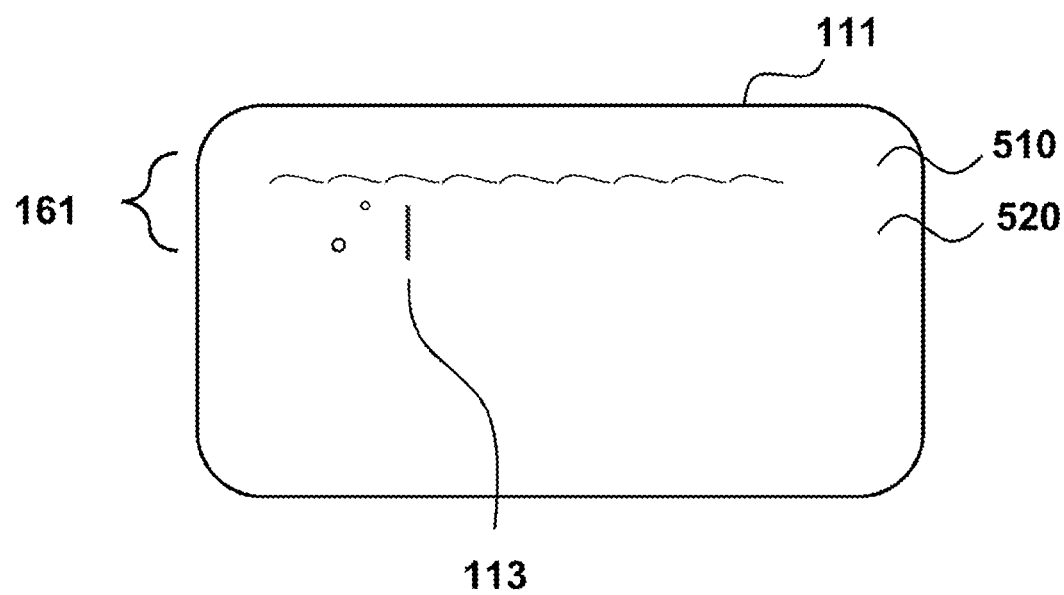
FIGS. 39, 40, 41, 42, and 43 are drawings illustrating a text input area after steps S23, S25, S27, S25 again, and S27 again are performed, respectively.

FIGS. 39, 40, 41, 42, and 43 are drawings illustrating a text input area after steps S23, S25, S27, S25 again, and S27 again are performed, respectively. Referring to FIG. 39, an upper pseudo-image part 161 may be provided in the text input area 111 in response to a first image-part key input. The upper pseudo-image part 161 may represent graphical objects such as a wave and a water bubble. For example, nine Unicode characters of code point U+13083 (CLDR name: EGYPTIAN HIEROGLYPH D013) may represent waves in a first text line 510, a Unicode character of code point U+FF61 (CLDR name: HALFWIDTH IDEOGRAPHIC FULL STOP) may represent a water bubble below the waves, and a Unicode character of code point U+FF9F (CLDR name: HALFWIDTH KATAKANA SEMI-VOICED SOUND MARK) may represent another water bubble below the waves in a second text line 520. Appropriate number of blank Unicode characters and/or a new-line Unicode character may be included in the first text line 510 and/or the second text line 520.

Figure 40:
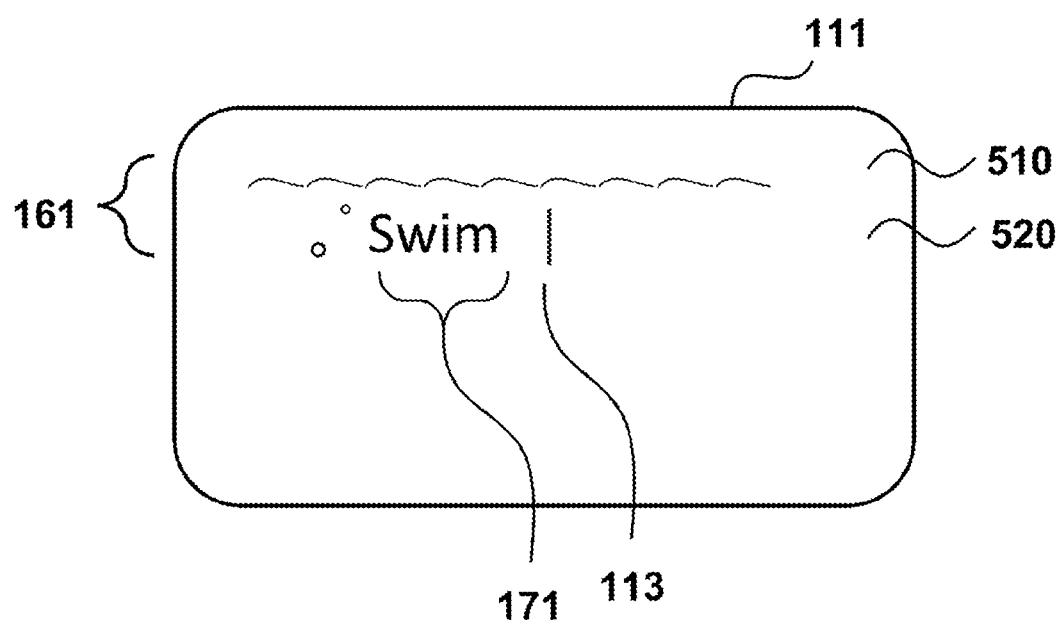

Referring to FIG. 40, an exemplary word "Swim" 171 may be provided after the upper pseudo-image part 161 in the text input area 111 in response to some letter key inputs. In some cases, the word 171 may be located in the same text line 520 as a lowermost text line that the upper pseudo-image part 161 is located in the text input area 111.

Figure 41:
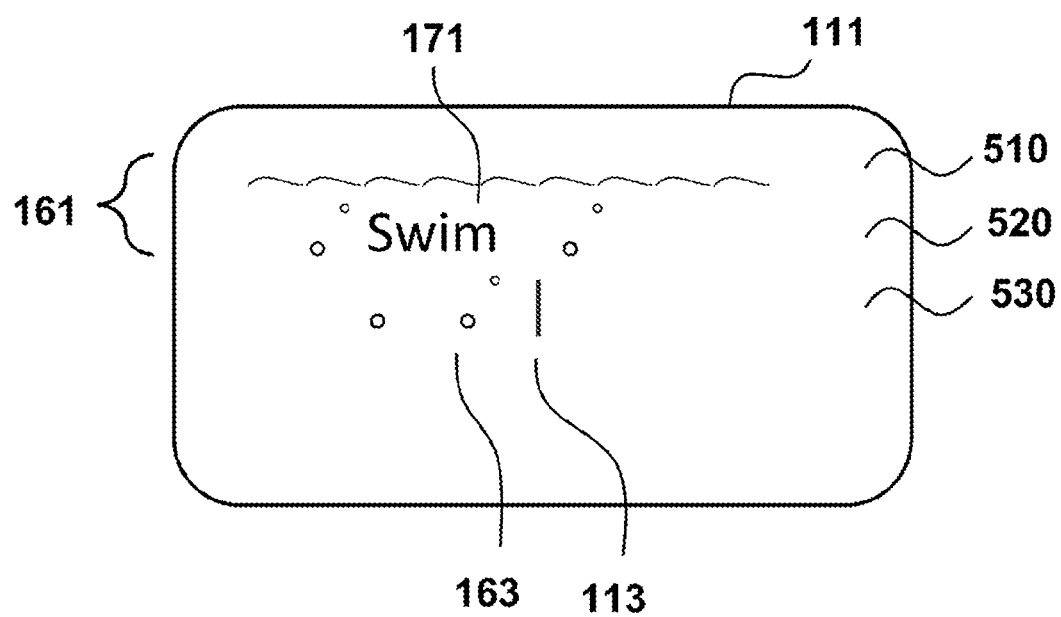

Referring to FIG. 41, a first lower pseudo-image part 163 may be provided in the text input area 111 in response to a second image-part key input. The first lower pseudo-image part 163 may represent graphical objects such as a water bubble. For example, a Unicode character of code point U+FF61 (CLDR name: HALFWIDTH IDEOGRAPHIC FULL STOP) may represent a water bubble below the waves, and a Unicode character of code point U+FF9F (CLDR name: HALFWIDTH KATAKANA SEMI-VOICED SOUND MARK) may represent another water bubble below the waves in a second text line 520. The first lower pseudo-image part 163 may include appropriate number of blank Unicode characters and/or a new-line Unicode character. The first lower pseudo-image part 163 may further include two Unicode characters of code point U+FF61 and a Unicode character of code point U+FF9F that represent water bubbles in a third text line 530.

Figure 42:
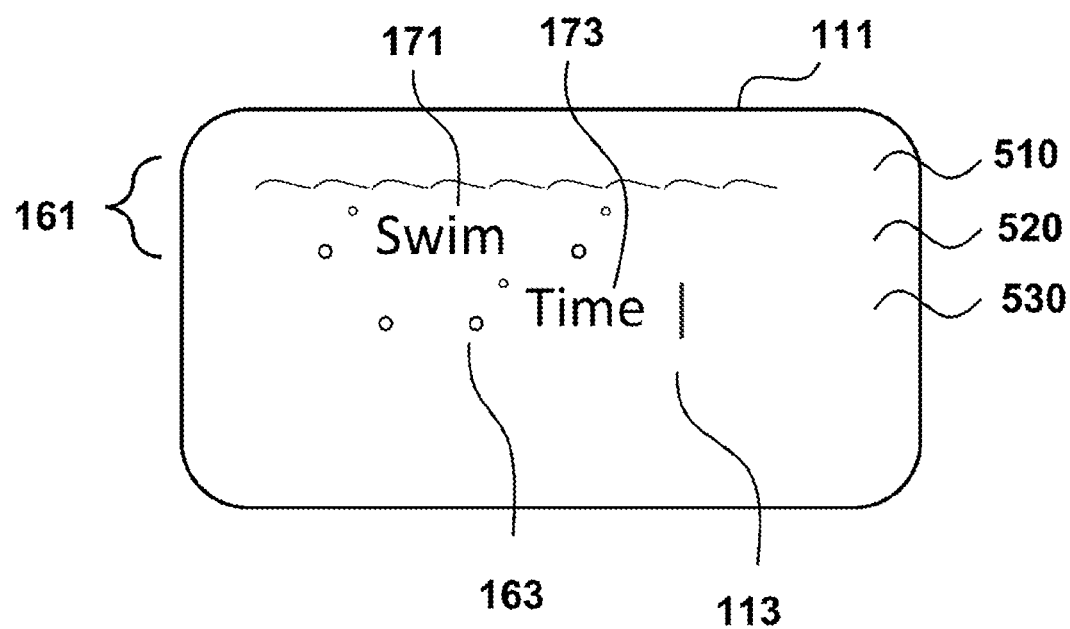

Referring to FIG. 42, an exemplary word "Time" 173 may be provided after the first lower pseudo-image part 163 in the text input area 111 in response to some letter key inputs. In some cases, the word 173 may be located in the same text line 530 as a lowermost text line that the first lower pseudo-image part 163 is located in the text input area 111.

Figure 43:
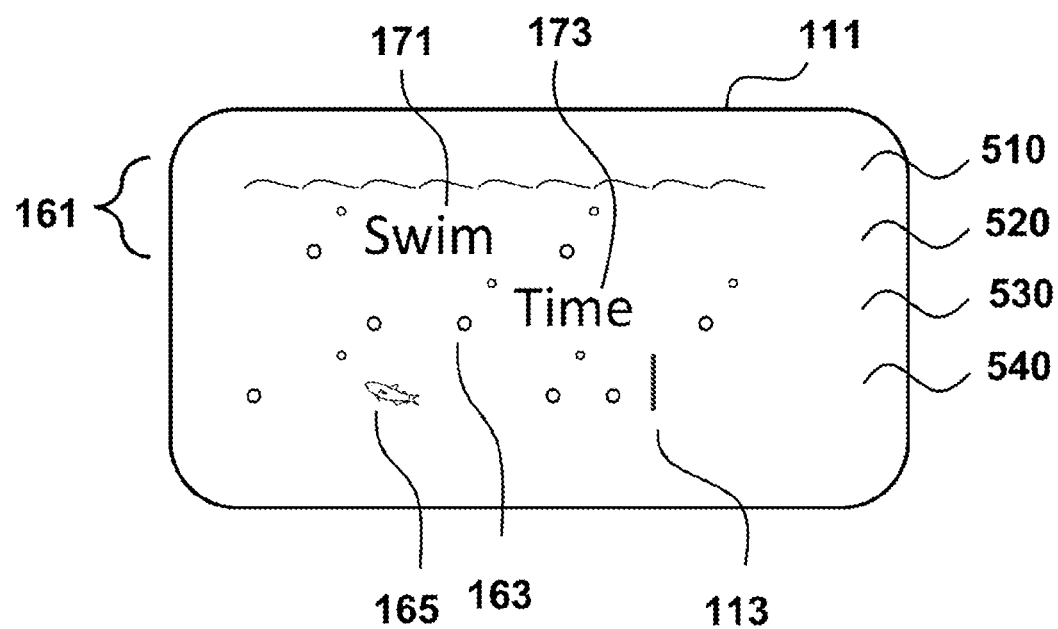

Referring to FIG. 43, a second lower pseudo-image part 165 may be provided in the text input area 111 in response to a third image-part key input. The second lower pseudo-image part 165 may represent graphical objects such as a fish and a water bubble. For example, a Unicode character of code point U+FF61 (CLDR name: HALFWIDTH IDEOGRAPHIC FULL STOP) may represent a water bubble, and a Unicode character of code point U+FF9F (CLDR name: HALFWIDTH KATAKANA SEMI-VOICED SOUND MARK) may represent another water bubble in a third text line 530. The second lower pseudo-image part 165 may include appropriate number of blank Unicode characters and/or a new-line Unicode character. The second lower pseudo-image part 165 may further include three Unicode characters of code point U+FF61, two Unicode characters of code point U+FF9F that represent water bubbles, and a Unicode character of code point U+1319D (CLDR name: EGYPTIAN HIEROGLYPH K003) that represents a fish in a fourth text line 540. Although a "fish" Unicode character of code point U+1319D is illustrated in FIG. 43, one skilled in the art would recognize that an emoji Unicode character such as a Unicode character of code point U+1F41F (CLDR name: FISH) may be chosen to represent a fish below the waves. In this case, a Unicode character of code point U+1F41F may be represented to have at least two colors (e.g., red, green, blue, or a combination thereof, gradient, etc.) in the text input area 111 based on an operating system, an application that implements the text input area 111, or a text renderer.

It will be appreciated by those skilled in the art that each of the Unicode characters described in embodiments may be implemented as a character type, a string type, an array of character types, an array of string types, and so on. However, it is to be understood that an implementation of a plurality of Unicode characters is not limited to the type of an array or a string, and that any various data types may be used e.g., to store and/or refer to several Unicode characters implemented as a character type.

According to embodiments, a method for inputting a group of Unicode characters representing these various pseudo-image parts may be configured to be applied only in a single application, or in any number of applications that the group of Unicode characters may be input.

For example, if the device 100 is a smartphone or tablet computer that includes a touchscreen, the method for inputting characters according to an embodiment may be implemented in a form of a keyboard application extension program, which may be applied for an independent application that is executable on an operating system of the smartphone or tablet computer. In this case, a method for inputting characters may be implemented e.g., as follows: if a desired request (e.g., a key input, etc.) is transferred to the keyboard application extension program from a host application executable on the device 100 by a system control program such as, e.g., the operating system or kernel of the device 100, then the keyboard application extension program may perform a process for the request and may transfer a result back to the host application. Thus, a method for inputting characters according to embodiments of the disclosure may be implemented for any host application that the keyboard application extension program may be applied.

For example, if the device 100 is a smartphone or tablet computer that includes a touchscreen, the method for inputting characters according to an embodiment may be implemented in a form of a system input interface module that is executable on an operating system of the smartphone or tablet computer. In this case, the method for inputting characters according to embodiments of the disclosure may be implemented as an example of an optional keyboard interface module, which is added to a conventional keyboard interface module executable on the operating system.

The above-mentioned implementations are exemplary only, and they are not intended to limit implementations of a method of inputting characters according to embodiments. For example, devices and methods for inputting characters according to embodiments may be implemented in a form of computing devices described above, as well as in a form of computer-executable (and/or computer-readable) instructions that may be stored in a tangible, non-transient computer-readable storage medium and performed on various computer systems. In addition, a computer program according to embodiments may be implemented in a form of an application for personal computers or mobile devices, or in a form of an application extension program. An application may be installed on the device via one or more files provided by a file distribution system. In this case, the file distribution system may send a file including the program to the device based on a request from the device.

While various exemplary embodiments of the systems and methods have been described above, they have been presented for purposes of example only, not limitations. It is not exhaustive and does not limit the disclosure to the precise form disclosed. Modifications and variations are possible considering the above teachings or may be acquired from practicing of the disclosure, without departing from the scope of the disclosure.

The invention claimed is:

1. A method of inputting characters capable of being performed on a device,
wherein the device is configured to display a text input area that a text input position is located therein, and a keyboard area separate from the text input area, the text input area being configured so that characters are input in multiple text lines,
wherein the method comprises:
displaying a first screen of the keyboard area including an upper pseudo-image part, a lower pseudo-image part, and a plurality of image-pixel keys, wherein each of the plurality of image-pixel keys is a key indicating one or more non-blank Unicode characters to be included in a pseudo-image, wherein the pseudo-image is a sequence of Unicode characters that, when provided in the text input area, represents a graphical concept having a single visual context not by an interpretation of literal meaning of the sequence of Unicode characters but by a combination of visual marks of the sequence of Unicode characters arranged across a plurality of text lines in the text input area, wherein the pseudo-image includes the upper pseudo-image part and the lower pseudo-image part, wherein the upper pseudo-image part is a first sequence of Unicode characters whose visual marks represent, when provided in the text input area, one or more upper graphical objects of the graphical concept, wherein the lower pseudo-image part is a second sequence of Unicode characters whose visual marks represent, when provided in the text input area, one or more lower graphical objects of the graphical concept which are below the one or more upper graphical objects in the text input area, and wherein the upper pseudo-image part is disposed above the lower pseudo-image part in a vertical direction in the first screen;
changing a Unicode character in one of the upper pseudo-image part and the lower pseudo-image part in the first screen into a first non-blank Unicode character in response to a first image-pixel key input provided to a first image-pixel key among the plurality of image-pixel keys, wherein the first image-pixel key indicates the first non-blank Unicode character;

displaying a second screen of the keyboard area different from the first screen of the keyboard area, wherein the second screen of the keyboard area includes a first image-part key indicating the upper pseudo-image part, a second image-part key indicating the lower pseudo-image part, and a plurality of English letter keys;

providing the upper pseudo-image part in the text input area in response to a first image-part key input on the first image-part key, wherein the one or more upper graphical objects are represented by the upper pseudo-image part in the text input area;

providing a plurality of Unicode characters that includes an English word, in the text input area in response to sequential letter key inputs corresponding to at least one letter key among the plurality of English letter keys; and providing the lower pseudo-image part in the text input area in response to a second image-part key input on the second image-part key, wherein the one or more lower graphical objects are represented by the lower pseudo-image part in the text input area, wherein one of the upper pseudo-image part and the lower pseudo-image part provided in the text input area includes the first non-blank Unicode character, and wherein the English word is located between the upper pseudo-image part and the lower pseudo-image part in the text input area with respect to a writing direction of English.

2. The method of claim 1,
wherein the graphical concept is represented after both the upper pseudo-image part and the lower pseudo-image part are provided in the text input area.

3. The method of claim 1,
wherein the plurality of image-pixel keys further include a second image-pixel key that indicates a second non-blank Unicode character different from the first non-blank Unicode character, wherein after the changing the Unicode character in the one of the upper pseudo-image part and the lower pseudo-image part in the first screen into the first non-blank Unicode character, and before the displaying the second screen of the keyboard area, the method further includes:

changing the first non-blank Unicode character in the one of the upper pseudo-image part and the lower pseudo-image part in the first screen into the second non-blank Unicode character in response to a second image-pixel key input provided to the second image-pixel key, and wherein the one of the upper pseudo-image part and the lower pseudo-image part provided in the text input area includes the second non-blank Unicode character instead of the first non-blank Unicode character.

4. The method of claim 1,
wherein the graphical concept is a human face, and
wherein the one or more upper graphical objects include one of an eyebrow and an eye, and the one or more lower graphical objects include a mouth.

5. The method of claim 4,
wherein the upper pseudo-image part and the lower pseudo-image part displayed in the first screen represent a first facial expression of the human face before the changing the Unicode character in the one of the upper pseudo-image part and the lower pseudo-image part in the first screen into the first non-blank Unicode character, and wherein the upper pseudo-image part and the lower pseudo-image part displayed in the first screen represent a second facial expression of the human face different from the first facial expression after the changing the Unicode character in the one of the upper pseudo-image part and the lower pseudo-image part in the first screen into the first non-blank Unicode character.

6. The method of claim 4,
wherein the one or more upper graphical objects further include an upper part of a speech bubble, and the one or more lower graphical objects further include a lower part of a speech bubble.

7. The method of claim 6,
wherein the English word is located within a width of one of the upper part of the speech bubble and the lower part of the speech bubble in a horizontal direction of the text input area.

8. The method of claim 1,
wherein the graphical concept is an animal, and
wherein the one or more upper graphical objects include an eye, and the one or more lower graphical objects include a body outline.

9. The method of claim 1,
wherein the graphical concept is a natural scene,
wherein the one or more upper graphical objects include one of a star, a sun, a moon, a cloud, a wave, and a water bubble, and
wherein the one or more lower graphical objects include one of a cloud, an animal, a plant, a building, a vehicle, a star, a wind, a rain, a snow, and a water bubble.

10. The method of claim 1,
wherein one of the upper pseudo-image part and the lower pseudo-image part includes a blank Unicode character.

11. The method of claim 1,
wherein one of the upper pseudo-image part and the lower pseudo-image part includes a new-line Unicode character.

12. The method of claim 1,
wherein in the second screen of the keyboard area, a first identification label of the first image-part key includes at least one Unicode character of the upper pseudo-image part, and a second identification label of the second image-part key includes at least one Unicode character of the lower pseudo-image part.

13. The method of claim 1,
wherein the second screen of the keyboard area includes a main keyboard area and a supplementary keyboard area separate from the main keyboard area, and
wherein the plurality of English letter keys are displayed in the main keyboard area, and the plurality of image-part keys are displayed in the supplementary keyboard area.

14. The method of claim 1,
wherein the English word is located in the same text line as a lowermost text line that the upper pseudo-image part is located in the text input area.

15. The method of claim 1,
wherein the English word is located in a text line above the lower pseudo-image part in the text input area.

16. The method of claim 1,
wherein a count of text lines that the upper pseudo-image part is provided in the text input area is different from a count of text lines that the lower pseudo-image part is provided.

17. The method of claim 1,
wherein the lower pseudo-image part is located in a text line right below the upper pseudo-image part in the text input area.

18. The method of claim 1,
wherein in the first screen of the keyboard area, the plurality of image-pixel keys are disposed below the upper pseudo-image part and the lower pseudo-image part.

19. The method of claim 1,
wherein the first screen of the keyboard area further includes a screen change key distinct from the plurality of image-pixel keys, and
wherein the displaying the second screen of the keyboard area includes:
displaying the second screen of the keyboard area in response to a key input on the screen change key.

20. The method of claim 1,
wherein the first screen of the keyboard area further includes a selection key indicating a first graphical object in the one or more upper graphical objects or in the one or more lower graphical objects, and
wherein the changing the Unicode character in the one of the upper pseudo-image part and the lower pseudo-image part in the first screen into the first non-blank Unicode character includes:
changing a Unicode character that represents the first graphical object in one of the upper pseudo-image part and the lower pseudo-image part in the first screen into the first non-blank Unicode character.

* * * * *